(12) United States Patent
Danilov et al.

(10) Patent No.: US 9,880,870 B1
(45) Date of Patent: Jan. 30, 2018

(54) LIVE MIGRATION OF VIRTUAL MACHINES USING PACKET DUPLICATION

(71) Applicant: Amazon Technologies, Inc., Seattle, WA (US)

(72) Inventors: Mikhail Danilov, Kirkland, WA (US); Marcin Piotr Kowalski, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 122 days.

(21) Appl. No.: 14/864,682

(22) Filed: Sep. 24, 2015

(51) Int. Cl.
*G06F 9/455* (2006.01)

(52) U.S. Cl.
CPC .. *G06F 9/45558* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,761,573 B2 | 7/2010 | Travostino et al. | |
| 8,281,013 B2 | 10/2012 | Mundkur et al. | |
| 8,370,560 B2 | 2/2013 | Dow et al. | |
| 8,635,396 B2 | 1/2014 | Dow et al. | |
| 8,689,211 B2 | 4/2014 | Agbaria et al. | |
| 2007/0153741 A1* | 7/2007 | Blanchette | H04L 45/66 370/331 |
| 2008/0084884 A1* | 4/2008 | Bahattab | H04L 45/00 370/392 |
| 2010/0071025 A1 | 3/2010 | Devine et al. | |
| 2010/0125667 A1* | 5/2010 | Soundararajan | H04L 12/2697 709/227 |

(Continued)

FOREIGN PATENT DOCUMENTS

WO 2014032233 3/2014

OTHER PUBLICATIONS

Raad et al. Achieving Sub-Second Downtimes in Large-Scale Virtual Machine Migrations with LISP. [online] (Apr. 8, 2014). IEEE., pp. 1-11. Retrieved From the Internet <https://www.researchgate.net/profile/S_Secci/publication/262881919_Achieving_Sub-Second_Downtimes_in_Large-Scale_Virtual_Machine_Migrations_with_LISP/links/53dac64d0cf2631430cb122>.*

(Continued)

*Primary Examiner* — Emerson Puente
*Assistant Examiner* — Jonathan R Labud
(74) *Attorney, Agent, or Firm* — Robert C. Kowert; Meyertons, Hood, Kivlin, Kowert & Goetzel, P.C.

(57) ABSTRACT

A virtualization management component of a particular host at a virtualized computing determines that a packet duplication phase of a migration of a virtual machine from a source host to the particular host has begun. The virtualization management component detects that a migrated version of the virtual machine, instantiated at the particular virtualization host, has generated a baseline packet directed to a destination address. The virtualization management component sends a first encapsulation packet comprising the baseline packet to an encapsulation intermediary associated with the destination address. The virtualization management component sends a second encapsulation packet comprising the baseline packet to the source virtualization host, with a directive to forward the second encapsulation packet to the encapsulation intermediary.

20 Claims, 12 Drawing Sheets

(56) References Cited

U.S. PATENT DOCUMENTS

| | | |
|---|---|---|
| 2010/0299666 A1 | 11/2010 | Agbaria et al. |
| 2010/0332657 A1 | 12/2010 | Elyashev et al. |
| 2011/0066597 A1 | 3/2011 | Mashtizadeh et al. |
| 2011/0131568 A1 | 6/2011 | Heim |
| 2011/0179415 A1 | 7/2011 | Donnellan et al. |
| 2012/0221710 A1 | 8/2012 | Tsirkin |
| 2012/0311568 A1 | 12/2012 | Jansen |
| 2013/0054813 A1 | 2/2013 | Bercovici et al. |
| 2013/0254321 A1 | 9/2013 | Johnsen et al. |
| 2013/0254368 A1 | 9/2013 | Guay et al. |
| 2014/0115175 A1 | 4/2014 | Lublin et al. |
| 2014/0269709 A1* | 9/2014 | Benny .................. H04L 45/64 370/392 |
| 2014/0286258 A1* | 9/2014 | Chowdhury .......... H04L 1/1812 370/329 |
| 2015/0169351 A1* | 6/2015 | Song .................. H04L 12/4641 718/1 |

OTHER PUBLICATIONS

Kagemusha et al. A guest-transparent Mobile IPv6 mechanism for wide-area live VM migration. [online] (Jun. 8, 2012). IEEE., pp. 1319-1326. Retrieved From the Internet <http://ieeexplore.ieee.org/abstract/document/6212069/>.*

Cervenka, Ales. Communication Reflector Encapsulation into Virtual Machine. [online] (2007). Masaryk University., pp. 1-43. Retrieved From the Internet <https://is.muni.cz/th/72557/fi__m/thesis.pdf>.*

U.S. Appl. No. 14/658,965, filed Mar. 16, 2015, Weili Zhong Mcclenahan.

U.S. Appl. No. 14/317,949, filed Jun. 27, 2014, Matthew Shawn Wilson, et al.

U.S. Appl. No. 14/163,096, filed Jan. 24, 2014, Jean-Paul Bauer, et al.

Amazon Web Services, "Amazon Virtual Private Cloud User Guide", API Version, Apr. 15, 2015, pp. 1-206.

* cited by examiner

LIVE MIGRATION OF VIRTUAL MACHINES USING PACKET DUPLICATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more virtual machines hosted by the single virtualization host. Each such virtual machine may represent a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

For several reasons including load balancing, scheduled hardware/software maintenance operations and the like, techniques for live migration of virtual machines from one virtualization host to another may be implemented in some environments. During live migration, the state of various resources (e.g., physical memory, networking devices and the like) being used by a virtual machine at the source virtualization host may have to be replicated at a destination virtualization host while minimizing interruptions to the applications being run on the virtual machine. Furthermore, network connections between the migrating virtual machine and various other entities (such as other virtual machines instantiated at various other hosts) may have to be maintained, also while minimizing the interruptions. In at least some virtual computing environments, an encapsulation protocol may typically be implemented for network traffic between virtual machines instantiated at different hosts. In order to route packets directed to a given virtual machine to the appropriate virtualization host, mappings indicating the hosts at which various virtual machines are instantiated may have to be propagated among the entities responsible for implementing the encapsulation protocol (such as virtualization management components at the hosts, routers, etc.). However, it may not be straightforward to atomically and quickly propagate a mapping updated as a result of a live migration among all the different entities at which the updated mapping may be required.

Figure 1:
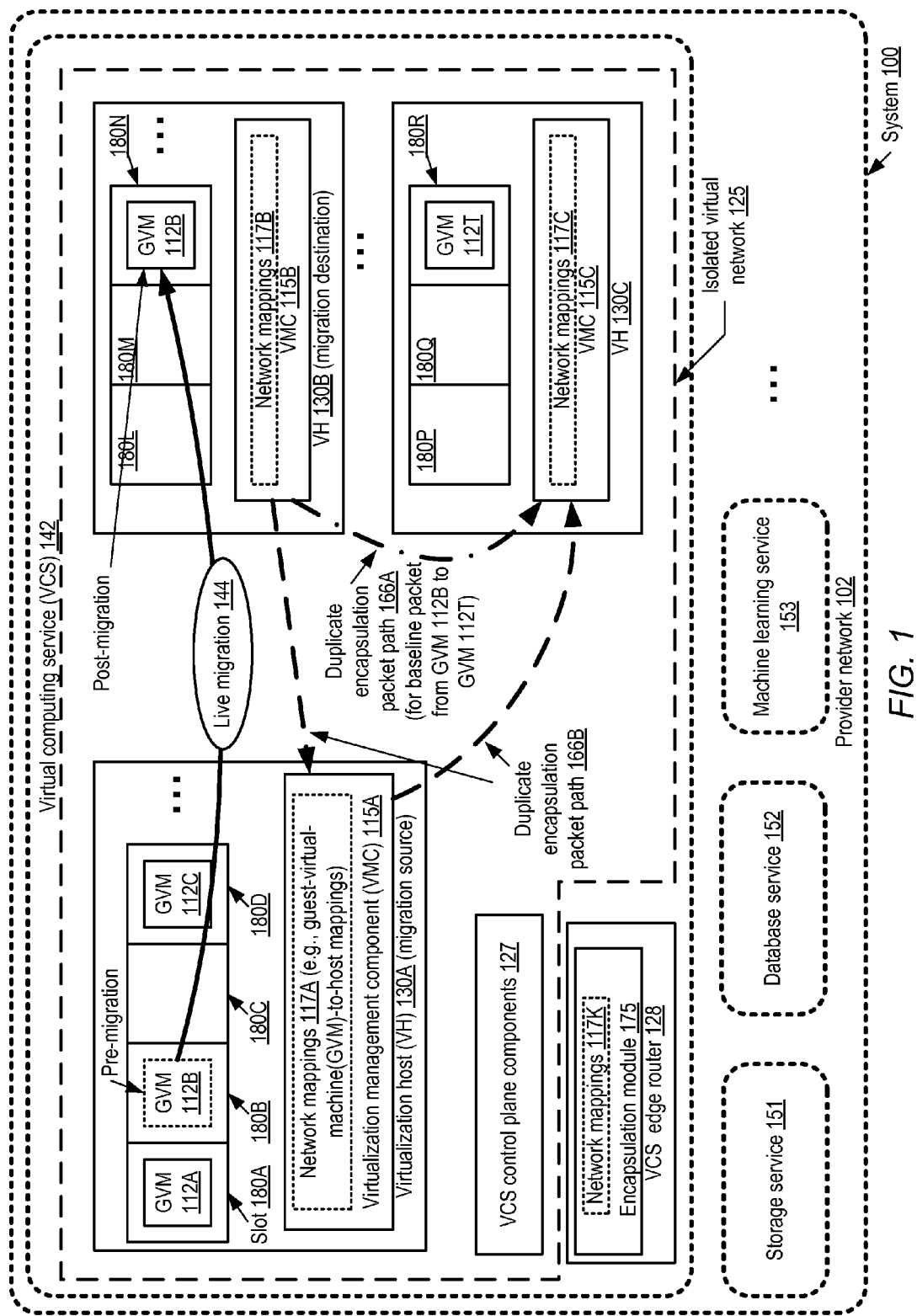
FIG. 1 illustrates an example system environment in which a packet duplication technique is employed during a portion of a migration procedure for guest virtual machines of a virtual computing service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for a live migration procedure for virtual machines during which some outbound network packets from a migrating virtual machine may be duplicated are described. A virtual computing service (e.g., implemented at a provider network) may comprise numerous computer servers called virtualization hosts, at each of which one or more guest virtual machines (GVMs) may be instantiated on behalf of one or more clients of the service in various embodiments. Under some conditions, for example for workload management purposes such as load balancing and automated scaling, or in response to a request from a client, a given GVM may be migrated or transferred from one virtualization host (which may be termed the migration-source) to another (which may be termed the migration-destination). In at least some embodiments, such a migration may be accomplished without rebooting the transferred GVM (and therefore without causing long interruptions to applications running at the transferred GVM), and may be referred to as a "live" migration. In various embodiments, the live migration algorithms used may be designed to make the migration as transparent as possible to communication peers of the migrating GVM (e.g., to other GVMs or network endpoints which are sending packets to, and receiving packets from, the migrating GVM), as well as to the applications running locally at the migrating GVM. Ideally, in such embodiments, a communication peer which has established connectivity to the migrating GVM prior to the migration should continue its communications with the migrating GVM as though nothing has changed with respect to the migrating GVM's environment, despite the fact that a different virtualization host is used for the migrating GVM after live migration than was used before the live migration. In various embodiments, an IP (Internet Protocol) address assigned to the migrating GVM (e.g., to a virtual network interface associated with the migrating GVM) may remain unchanged despite the migration. Packets indicating that IP address as the destination may continue to be delivered at desired performance levels (corresponding to service-level agreements of the VCS) to the migrating GVM regardless of the change of virtualization host. Packets received by the communication peer from the migrating GVM may continue to arrive at desired performance levels, and may indicate that IP address as the source regardless of the change of virtualization host.

In at least some embodiments, an encapsulation protocol may be implemented at various components of the virtual computing service (VCS) to enable GVM-to-GVM communications from one virtualization host to another, and to enable communications between a GVM and entities outside the VCS (such as devices of the public Internet, devices of networks owned/managed by VCS clients, or network-accessible services other than the VCS). The encapsulation protocol may be implemented, for example, at virtualization management components (VMCs) of the virtualization hosts, such as hypervisors or privileged domain operating system instances, which act as intermediaries between the GVMs and hardware components of the virtualization hosts. The encapsulation protocol may also be implemented at encapsulation modules or components of various edge routers and/or internal routers of the VCS, at some load balancers, gateways, or other devices associated with the VCS. Collectively, the entities which perform processing (such as enveloping a baseline packet within the body of a larger packet, extracting such baseline packets from the larger packets, and/or taking actions based on the contents of various encapsulation protocol headers of received packets) associated with the encapsulation protocol to facilitate GVM network traffic, such as the VMCs and/or the encapsulation modules/components at routers and other networking devices, may be referred to as "encapsulation intermediaries" herein.

According to the encapsulation protocol, a message generated at an application process executing at a particular GVM (e.g., GVM1) of a particular virtualization host (e.g., VH1) and directed to an application process at a different GVM (e.g., GVM2) at a different virtualization host (VH2) may be included in an outbound baseline packet OBP1 at the networking software stack of GVM1. The term "baseline" is used herein to refer to the packets generated at or received by the networking software stacks of various GVMs, as opposed to the typically larger "encapsulation" packets described below, which are generated by the encapsulation intermediaries. (In some cases, of course, a message may be large enough to require multiple baseline packets, in which case each of the multiple baseline packets may be encapsulated similarly.) Assuming that an IP-based networking protocol is used for GVM-to-GVM communication, the outbound baseline packet OBP1 may indicate an IP address GVMAddr1 assigned to GVM1 as the source IP address, and an IP address GVMAddr2 assigned to GVM2 as the destination address. In various embodiments, the IP address assigned to a GVM (or, more specifically, to a virtual network interface associated with the GVM) may typically differ from the IP address assigned to the virtualization host at which that GVM runs. For example, VH1 may have an address VHAddr1 assigned to it, and VH2 may have address VHAddr2 assigned to it. In order to route GVM-to-GVM packets correctly, network mappings indicating the relationship between GVMs and virtualization hosts may be used, e.g., as part of the encapsulation procedure. Such network mappings may be formatted in various ways in different embodiments: for example, a tuple <GVM ID, GVM IP address, VH ID, VH IP address> may be used for each GVM-to-host entry in one embodiment, while a tuple indicating all the GVMs running at a given VH may be used in another embodiment.

In the example where the outbound baseline packet OBP1 is created at GVM1 of host VH1, the virtualization management component VMC1 of VH1 may intercept OBP1 and construct a corresponding outbound encapsulation packet OEP1. OEP1 may include one or more headers defined by the encapsulation protocol, for example, and the body of OEP1 may include OBP1. In at least some embodiments, OEP1 may indicate host address VHAddr1 as a source address, and VHAddr2 (or some intermediary address on a route towards VH2) as a destination address. OEP1 may be transmitted using VH1's physical network interface card (NIC) on its path towards VH2. When OEP1 reaches VH2, the virtualization management component VMC2 may examine its contents, and identify both the sender GVM (GVM1) and the source virtualization host (VH1) indicated in OEP1. In some implementations, for example, the sender GVM may be indicated in one of the encapsulation protocol headers, while in other implementations the sender GVM may be obtained from the encapsulated baseline packet OBP1. To determine whether the received packet OEP1 is valid, VMC2 may examine whether a mapping between GVM1 and VH1 exists in VMC2's network mapping database. If such a mapping is found, the received encapsulation packet OEP1 may be considered legitimate or valid in various embodiments, and the extracted baseline packet OBP1 may be provided to GVM2. If such a mapping is not found, OEP1 may be considered invalid and rejected or dropped in at least some embodiments, and the baseline packet contained in OEP1 may not be provided to GVM2. A similar encapsulation technique may be employed for inbound packets with respect to GVM1 (e.g., a baseline packet generated at GVM2 may be incorporated within an encapsulation packet generated by VMC2, received and checked for a valid network mapping between GVM2 and VH2 at VMC1, and accepted or rejected based on the result of the mapping-based validity check). In addition, network mappings may also be used to check validity of encapsulation packets at various other encapsulation intermediaries such as modules of edge routers of the VCS, gateways, load balancers and the like in at least some embodiments. If a packet received at an edge router, for example, is deemed invalid based at least in part on the absence of a corresponding GVM-to-host mapping in the edge router's database, the packet may be dropped. In contrast, the contents of a packet which is deemed valid (based at least in part on the presence of a corresponding GVM-to-host mapping in the database) at the edge router may be transmitted along a selected route towards the destination indicated in the packet.

If and when a particular GVM (e.g., GVM1) is live migrated from one virtualization host (e.g., migration-source VH1) to another (e.g., migration-destination VH3), in various embodiments a new GVM-to-host mapping indicating that VH1 is instantiated at VH3 may be created and propagated to the various components of the VCS. Such VCS components may include, for example encapsulation intermediaries such as respective VMCs at other hosts including VH2, edge routers, gateways, load balancers, etc. The new mapping (linking GVM1 to migration-destination VH3) may override the previous mapping regarding GVM1 (which linked GVM1 to migration-source VH1). If, after GVM1 has been activated at VH3, an encapsulation intermediary such as VMC2 has not received the updated mapping, packets received from the migrated version of GVM1 may be dropped (e.g., because VMC2 expected the packet to have been sent from VH1 based on the previous mapping, not from VH3). While at least some applications run at the GVMs may be able to sustain a few dropped packets, a large number of packet drops due to out-of-date network mappings may cause unacceptable application-level disruption. However, at least in some large VCS environments which may comprise tens of thousands of geographically dispersed virtualization hosts and other devices at which the encapsulation protocol is implemented, an atomic propagation of updated GVM-to-host network mappings to all the hosts and entities at which the updated entries are needed may be hard to accomplish.

In order to avoid or reduce potential problems which may arise as a result of the fact that network mappings used for the encapsulation protocol may not be propagated atomically or sufficiently quickly to all intended recipients, an algorithm involving the temporary duplication and forwarding of some packets from a live migrated GVM may be employed in some embodiments. As described below in further detail in the context of FIG. 3, the process of live migrating a GVM may include several stages or phases. For example, after a decision to live migrate a given GVM (e.g., GVM1) from a migration-source VH (e.g., VH1) is made, a number of validity checks may be performed, the migration-destination VH (e.g., VH3) may be prepared, a secure network connection may be established between the VMC (e.g., VMC1) at the migration source and the VMC (e.g., VMC3) at the migration destination, so on. At some point during the live migration process, the VMC (e.g., VMC1) at the migration-source VH1 may begin copying the contents of memory allocated to GVM1 to the memory of migration-destination VH3. After a certain amount of memory has been copied (e.g., as much memory as it is possible to copy without pausing operations at GVM1), the pre-migration version of GVM1 may be paused. A short critical section of the migration may be begun, during which device information, connection tracking records, and the like are transferred to the migration-destination VH3, together with any remaining memory content which has not already been transferred, while GVM1 remains paused at the migration-source and has not yet been activated at the migration-destination. After the device information, connection tracking information and the like have been copied successfully, the migrated version of GVM1 may be activated or brought online at VH3. Eventually, e.g., at some point after the migrated version becomes operational, resources which had been reserved for GVM1 at the migration-source VH1 may be freed.

In at least some embodiments, e.g., at or near the beginning of the critical section, the VMC (e.g., VMC1) at the migration-source may determine that a triggering condition for starting a packet duplication phase of the live migration procedure has been met. The VMC1 (or a different control plane component or administrative component of the VCS) may provide an indication of the starting of the packet duplication phase to the migration-destination's VMC (e.g., VMC3) in various embodiments. During the packet duplication phase, the migration-destination VMC may prepare two outbound encapsulation packets (e.g., OEP1 and OEP2) corresponding to a given outbound baseline packet generated at the migrated version of GVM1, e.g., instead of preparing just one encapsulation packet as described earlier. If the outbound baseline packet is directed to GVM2 at VH2, for example, one of the two encapsulation packets (e.g., OEP1) may be sent to VH2. The second outbound encapsulation packet (e.g., OEP2) may be sent to the migration-source VH1 by VMC3, with a directive to forward the second encapsulation packet to VH2 from VH1 after transforming the second encapsulation packet to make it appear as though it originated at VH1. In response to receiving OEP2 at VMC1 of VH1, a transformed version of OEP2, prepared in accordance with the directive, may be sent from VMC1 to VH2. The directive to forward OEP2 may be included in one or more headers of the encapsulation protocol in various embodiments.

Due to the duplication of encapsulation packets by the migration-destination VMC3, VMC2 at virtualization host VH2 may receive two different encapsulation packets, both containing the same baseline packet in various embodiments. At least one of the received encapsulation packets may be designated as valid based on the particular network mapping available at VMC3's mapping database when the packet is received, regardless of whether the updated mapping indicating that GVM1 has migrated to VH3 has been received at VMC2 or not. For example, if VMC2 has the old mapping entry <GVM1:VH1> indicating that GVM1 is instantiated at VH1, EOP1 may be rejected as invalid (because EOP1 indicates that GVM1 is instantiated at VH3), but EOP2 (which appears to indicate that GVM1 is still instantiated at VH1) may be accepted as valid. In contrast, if VMC2 has already received the updated mapping entry <GVM1:VH3>, EOP2 may be rejected and EOP1 may be accepted as valid. In some embodiments, in order to deal with some unlikely but possible race conditions, VMC2 and/or other recipients of the updated mapping may be instructed to consider both the old mapping and the updated mapping as valid for a configurable duration, and/or to recognize and discard duplicate baseline packets within certain configurable time windows. As a result of the packet duplication technique, in various embodiments the outbound baseline packet may be extracted by VMC2 from (at least) one of the encapsulation packets and provided to its intended recipient GVM2 at VH2. Thus, at least in some embodiments, the applications running at GVM2 (or GVM1) may experience no packet loss despite a potentially delayed propagation of the updated network mapping to VMC2. Similarly, other encapsulation packet recipients (such as edge routers) may also designate one of the encapsulation packets as valid based on the current state of the recipient's network mapping database in various embodiments, regardless of whether the network mapping database includes the post-migration network mapping or not.

In at least some embodiments, inbound encapsulation packets (e.g., containing baseline packets directed to the migrating GVM, GVM1) may continue to be received at the migration-source VMC1 for some time after the migrated version of GVM1 has been activated at the migration-destination. This may occur, for example, because the sender VMCs of such inbound encapsulation packets (e.g., VMC2) may not yet have received the updated network mapping indicating that GVM1 is now instantiated at VH3, and is no longer instantiated at VH1. In various embodiments, the migration-source VMC1 may forward such encapsulation packets (e.g., after an appropriate transformation to indicate that the inbound encapsulation packet originated at VMC2 and not VMC1) to the migration-destination VMC3. In at least one embodiment, the migration-source VMC1 may keep track of the rate or number of such misdirected encapsulation packets it receives. The rate of misdirected encapsulation packets received at the migration-source may be expected to fall as the updated mapping is propagated through the VCS. Eventually, in some embodiments, the migration-source VMC1 (or some other control plane component of the VCS) may detect that the rate or number of such packets has fallen below a threshold level, and notify the migration-destination VMC3 that the packet duplication phase is to be terminated. Upon receiving such a notification, the migration-destination VMC3 may stop duplicating outbound packets. In some embodiments, instead of using the rate or number of misdirected inbound encapsulation packets as a triggering condition for terminating packet duplication, the packet duplication phase may be terminated after a configurable time interval (e.g., T seconds) has elapsed since the packet duplication phase was begun or since the migrated version of GVM1 was activated. In one embodiment, after the packet duplication phase has completed, resources which had been reserved for the now-migrated GVM, e.g., at the migration source VH1, may be freed or released. In some embodiments, the migration-destination VMC may itself detect triggering conditions for starting and/or terminating packet duplication, and may not necessarily receive notifications from other parties such as the migration-source VMC regarding when to start or stop packet duplication.

Example System Environment

FIG. 1 illustrates an example system environment in which a packet duplication technique is employed during a portion of a migration procedure for guest virtual machines of a virtual computing service, according to at least some embodiments. In system 100, virtual computing service (VCS) 142 is implemented using resources of a provider network 102 at which a number of other network-accessible services, such as storage service 151 (which may for example expose block level device interfaces for storage volumes, or web services interfaces for unstructured storage objects), a database service 152, a machine learning service 153, and so on. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. A provider network may also sometimes be referred to as a "public cloud" environment. A given provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states or countries than others, and in some embodiments the resources allocated to a given application may be distributed among several such locations to achieve desired levels of availability, fault-resilience and performance. In at least some embodiments, a guest virtual machine executing on a virtualization host within a particular data center may be live migrated to a different virtualization host located at a different data center, e.g., in accordance with the availability and resiliency requirements of the client on whose behalf the guest virtual machine is instantiated. In other embodiments, live migrations may typically performed with a migration-destination host selected at the same data center as the migration-source host.

In at least some embodiments, at least some resources of the VCS such as virtualization hosts (VHs) 130A, 130B and 130C may be distributed among one or more isolated virtual networks (IVNs) such as IVN 125 established at the request of VCS clients. Within a given IVN, the client on whose behalf the IVN has been established may be granted substantial flexibility with respect to networking configurations—e.g., the client may choose a range of private IP addresses from which particular addresses are to be assigned to various guest virtual machines (GVMs) 112 of the IVN, configure subnets, establish security rules for incoming and outgoing traffic, set up routing table entries, and so on. The private IP addresses assigned within a given IVN 125 may not be accessible (at least by default) outside that IVN; as a result, the client may choose arbitrary IP addresses for the GVMs without having to be concerned with the possibility of duplicating addresses already assigned outside the IVN. When a given GVM within an IVN is live migrated, its private IP address may be retained across the migration in at least some embodiments. In general, IVN capability may enable VCS clients to set up networking configurations as though they were using client-owned resources, while benefiting from the scaling, availability and pricing-related advantages made possible by the provider network. IVNs may also be referred to as "virtual private clouds" in some provider network environments. It is noted that in some embodiments, GVMs may be live migrated even if IVNs are not implemented—that is, the techniques and algorithms for love migration discussed herein may not necessarily require IVNs to be supported.

In the embodiment shown in FIG. 1, IVN 125 comprises a plurality of virtualization hosts 130, including VH 130A, 130B and 130C, each with a respective virtualization management component (VMC) 115, such as VMC 115A, 115B and 115C. A VMC 115 may comprise, for example, a hypervisor and/or an instance of an operating system running in an administrative domain (sometimes referred to as "dom-0"). In addition the VMC 115, each VH 130 may have the resource capacity (e.g., processing capabilities, memory, storage etc.) to instantiate one or more GVMs 112. VH 130A, for example, is shown with four logical GVM slots 180A-180D, with each slot representing the resources required for one GVM. VH 130A comprises three GVMs (prior to the live migration 144): GVM 112A in slot 180A, GVM 112B in slot 180B, and GVM 112C in slot 180D. Not all the slots at a given VH may be occupied or assigned to GVMs at a given point in time, as exemplified by the empty slots shown at each of the VHs in FIG. 1. Using the live migration algorithms discussed herein, GVM 112B is transferred from slot 180B of VH 130A (the migration-source VH) to slot 180N of VH 130B (the migration-destination VH) in the depicted embodiment. As discussed in further detail below, the live migration 144 of GVM 112B from VH 130A may comprise a number of phases or steps, including at least one phase (a packet duplication phase) in which the migration-destination's VMC (115B) generates a pair of encapsulation packets for each outbound baseline packet from the migrated version of GVM 112B, and transmits the two encapsulation packets to a target VH (such as VH 130C) via different pathways or routes. In addition to the virtualization hosts 130, a VCS 142 may also include a collection 127 of other computing and/or networking devices which collectively constitute the control plane or administrative components of the VCS in various embodiments. Some control plane components 127 may be considered part of an IVN 125 in the depicted embodiment, while others may be considered independent of the IVNs. Such control plane components may be responsible, among other functions, for propagating networking configuration information including network mappings 117 among various entities of the VCS, initiating live migrations, and so on. The VMCs 115 may also be considered part of the VCS control plane in at least some embodiments.

An encapsulation protocol in which network mappings 117 are used to accept or reject received network packets may be implemented at various VCS components in the depicted embodiment, including the VMCs 115, edge routers 128 responsible for traffic entering or leaving the VCS (e.g., from or to other services of the provider network such as services 152, 153, or 154, or from or to devices outside the provider network), gateways, load balancers, and the like. According to the protocol, a baseline packet generated at a GVM 112 may be intercepted and incorporated within (e.g., as part of the body of) an enclosing encapsulation packet by the VMC 115 at the host at which that GVM runs. The baseline packet may, for example, indicate the IP address assigned to the source GVM (e.g., from a private IP address range associated with the IVN 125) in the packet's source IP address header, and the address of a destination GVM in the packet's destination IP address header. The encapsulation packet may comprise a different set of headers (whose syntax and semantics are defined in the encapsulation protocol) generated by the VMC. The encapsulation protocol headers may, for example indicate the IP address of the VMC's virtualization host as the source IP address, and an address assigned to the virtualization host at which the destination GVM is instantiated as the destination IP address. Some encapsulation headers may include directives or requests to the receiving encapsulation protocol executor to perform certain actions.

Upon receiving a given encapsulation packet, a VMC 115 may check the validity of the packet by examining whether its (the receiving VMC's) database of network mappings 117 contains an entry which indicates that the source GVM of the baseline packet incorporated within the received encapsulation packet is instantiated at the virtualization host which was the source of the received encapsulation packet. For example, if VMC 115C were to receive an encapsulation packet which indicated the combination (source GVM=112B, source VH=130A), and network mappings 117C had a mapping which indicated that GVM 112B is instantiated at VH 130A, the encapsulation packet would be accepted as valid. The baseline packet contained in the validated encapsulation packet may be extracted and passed on to the targeted GVM (such as GVM 112T). If, however, the network mappings 117C indicated that GVM 112B was instantiated at a host other than VH 130A (or if there were no mapping for GVM 112B in the database 117), the encapsulation packet may be rejected.

In the example scenario shown in FIG. 1, connectivity may have been established between the pre-migration version of the GVM 112B (e.g., the version of GVM 112B which ran on VH 130A) and another GVM 112T running in slot 180R of VH 130C. Any desired networking protocol, such as TCP (Transmission Control Protocol), UDP (User Datagram Protocol), or the like, may be used for GVM-to-GVM connectivity in various embodiments. Prior to the live migration 144, a single encapsulation packet corresponding to a given baseline packet outbound from GVM 112B to GVM 112T may have been prepared by the migration-source VMC 115A, and transmitted to VH 130C.

At some point during the live migration 144, the migration-destination VMC 115B may be informed or notified (e.g., by migration-source VMC 115A or by control plane components 127) that a packet duplication phase of the live migration has been initiated. A number of different conditions may trigger the packet duplication phase in various embodiments—e.g., packet duplication may begin when the migration-source VMC 115A determines that it has completed some subset of live migration tasks such as one or more stages of memory copying, or when the pre-migration version of GVM 112B is paused at VH 130A, or when the post-migration version of GVM 112B is activated at VH 130B, or as soon as propagation of a new network mapping indicating that GVM 112B is instantiated at VH 130B begins, and so on. During the packet duplication phase, if the migration-destination VMC 115B intercepts an outbound baseline packet from the migrated version of GVM 112B, directed to GVM 112T, two separate encapsulation packets incorporating that baseline packet may be generated. One of the two duplicate encapsulation packets may be transmitted from VMC 115B of VH 130B to VH 130C via pathway 166A (e.g., with VH 130C being indicated as the destination, and VH 130B being indicated as the source). The second duplicate encapsulation path may be sent from migration-destination VH 130B to migration-source VH 130A along path 166B, e.g., with a directive to VMC 115A to forward a suitably transformed version of the encapsulation packet to VH 130C. Upon receiving the second encapsulation packet from VH 130B, VMC 115A may determine that it is to be forwarded, generate a transformed version of the encapsulation packet which makes it appear as though the sender GVM 112B is still running at VH 130A, and send the transformed version to VH 130C.

A new or updated network mapping, indicating that GVM 112B has been migrated to, and is now instantiated at, migration-destination VH 130B may have been generated as part of the live migration procedure 144, or triggered by a completion of at least a portion of the live migration procedure in the depicted embodiment. The new mapping may be propagated to various entities of the VCS 142, including for example VH 130C, edge routers 128, and the like by control plane components 127 and/or by VMC 115A. Depending on the number of entities to which the updated mapping has to be transmitted, the utilization levels of the network links used for the propagation, and so on, it may sometimes be the case that VH 130C (or VMC 115C) has not received the new mapping when one or both of the duplicate encapsulation packets are received. If the old mapping remains in VMC 115C's network mapping database 117C, the forwarded version of the encapsulation packet (sent along path 166B) may be deemed to valid, and the encapsulation packet sent via path 166A may be rejected as invalid. In contrast, if the new version of the mapping, indicating that GVM 112B is now running on VH 130B, has been received and overridden the old mapping for GVM 112B, the forwarded version of the encapsulation packet may be rejected, and the packet sent via path 166A may be designated as valid. Either way, the baseline packet generated at the migrated version of GVM 112B would not be lost despite the delay in the propagation of the post-migration network mapping for GVM 112B, and would be extracted from the validated encapsulation packet and sent on to GVM 112T in the depicted embodiment.

During the time period in which at least some VCS components to which the updated network mapping (indicating that GVM 112B is instantiated at VH 130B) is being propagated have not yet received the updated network mapping in the depicted embodiment, it may be the case that some encapsulation packets containing baseline packets targeted for GVM 112B may be sent to VH 130A, e.g., even after the migrated version of GVM 112B has been activated at VH 130B. This may occur, for example, because the older mapping may have been used to generate such encapsulation packets. In the depicted embodiment, VMC 115A may detect that such packets have been misdirected to it (VMC 115A) instead of being sent to VMC 115B, and may therefore forward such misdirected packets (after suitable header modifications) to the correct destination VMC 115B at VH 130B. The baseline packets of such forwarded inbound encapsulation packets may be extracted by VMC 115B and passed on to the migrated version of GVM 112B. In at least one embodiment, in order to determine when the packet duplication phase is to be ended, the migration-source VMC 115A may keep track of the rate or number of misdirected packets it receives. When the rate falls below a particular threshold, the migration-destination VMC 115B may be informed that packet duplication is no longer required. In another embodiment, the packet duplication phase may be sustained for a configurable time interval after the migrated version of the GVM 112B was activated, regardless of the rate of misdirected packets. After the packet duplication phase has completed, the migration-destination VMC 115B may start generating and transmitting just one encapsulation packet per outbound baseline packet in the depicted embodiment (e.g., along path 166A if the destination GVM is 112T). Resources which may have been reserved for GVM 112B at the migration-source VH 130A (e.g., resources associated with slot 180B) may be freed after the live migration procedure, including the packet duplication phase, has been completed in the depicted embodiment.

If baseline packets generated at the migrated version of GVM 112B are directed to endpoints outside the IVN 125B or the VCS 142 during the packet duplication phase, such as to devices of services 152, 153 or 154, the two duplicated encapsulation packets may be sent from the migration-destination VMC 115B to edge routers 128 and/or other appropriate encapsulation protocol implementers in the depicted embodiment. A recipient of such a duplicated encapsulation packet pair (e.g., encapsulation module 175 in FIG. 1) may designate one of the pair as valid, and the other as invalid, depending on whether the new network mapping has reached the recipient or not, in a manner analogous to that of recipient VMC 115C of FIG. 1. Thus, respective instances of several different types of encapsulation intermediaries (e.g., VMCs 115 and encapsulation modules 175) may each utilize their respective network mapping databases (e.g., 117C and 117K) to determine the validity of received encapsulation packets, discard invalid packets, and implement the appropriate actions on validated packets in the depicted embodiment. The particular action taken for a validated packet may differ from one type of encapsulation intermediary to another—e.g., VMC 115C may transfer the contents of a baseline packet to destination GVM 112T, while encapsulation intermediary 175 may route at least a portion of the contents of the encapsulation packets to network endpoints outside the VCS. In some cases an edge router 128 may act as a protocol translator—e.g., it may extract an outbound baseline packet, encapsulate it using another tunneling protocol, and transmit the new encapsulated packet onwards towards its destination.

It is noted that in various embodiments, a given GVM such as 112B may be live migrated several different times. For example, at some point after it has been migrated to VH 130B, VH 112B may be migrated to another VH 130K (not shown in FIG. 1) with VH 130B acting as the migration-source host. A GVM may be migrated back to the original VH at which it was instantiated (or one of the VHs at which it has been instantiated thus far in its lifetime) in some cases, or to a VH at which a peer GVM with which the migrating GVM was communicating is instantiated. For example, GVM 112B may be live migrated back to VH 130A or to VH 130C in the embodiment shown in FIG. 1.

Packet Flow Between GVMs at Different Virtualization Hosts

Figure 2:
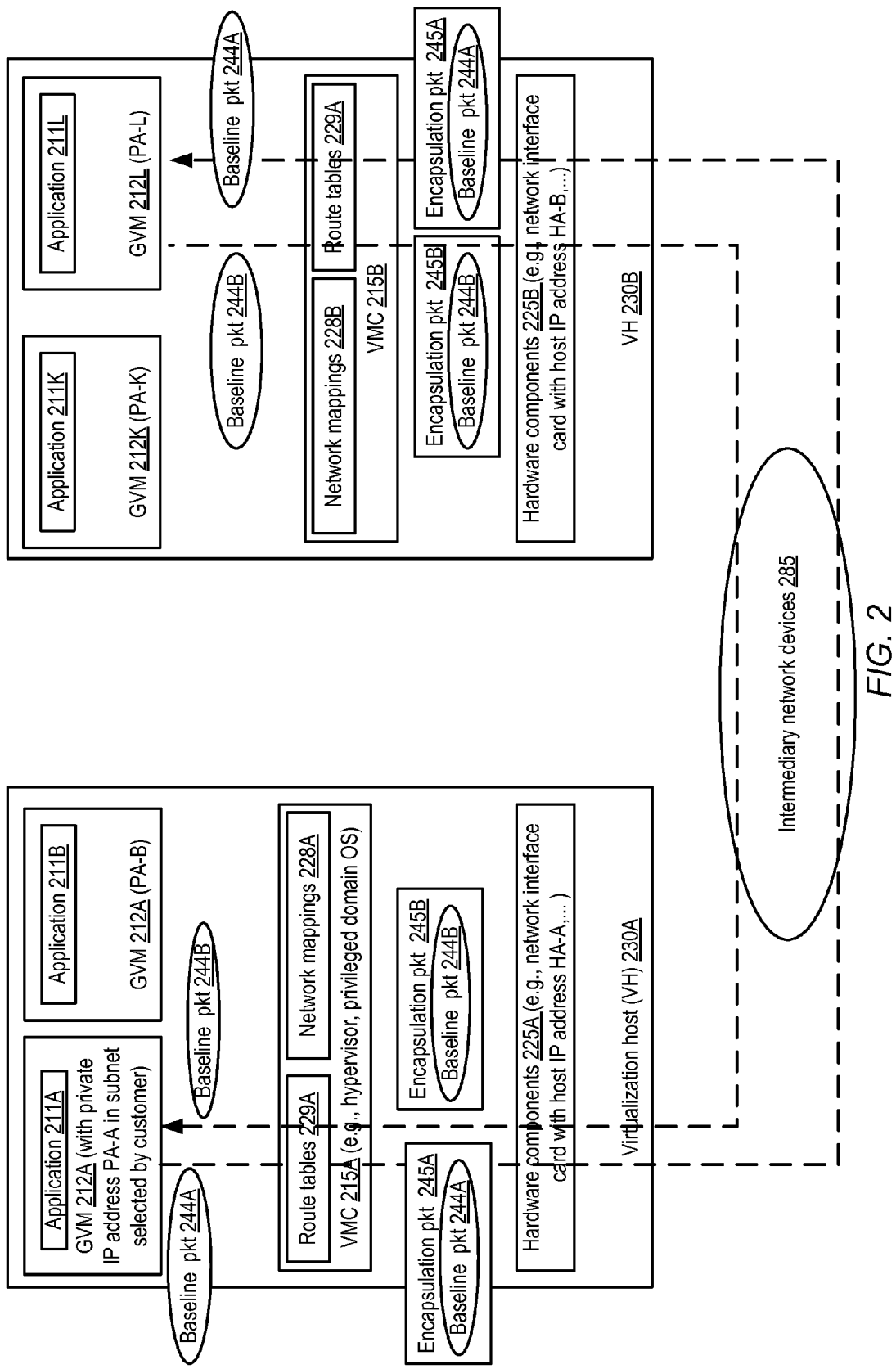
FIG. 2 provides an overview of network packet flow between virtual machines instantiated at different virtualization hosts, according to at least some embodiments.

FIG. 2 provides an overview of network packet flow between virtual machines instantiated at different virtualization hosts, according to at least some embodiments. Two virtualization hosts VH 230A and VH 230B of a virtual computing service (VCS) are shown. Both of the VHs 230 may be used for GVMs of the same isolated virtual network (IVN) in the depicted example, although similar packet flow paths may be used even if the two VHs are used at different IVNs, or if IVNs are not used at all. Each virtualization host may comprise one or more guest virtual machines, such as GVMs 212A and 212B at VH 130A, and GVMs 212K and 212L at VH 130B. In the depicted embodiment, each GVM 212 may be assigned at least one private IP address (such as PA-A, PA-B, PA-K or PA-L for GVMs 212A, 212B, 212K and 212L respectively), e.g., from the range of addresses of a subnet previously set up by the customer on whose behalf the IVN containing the GVM is established. For example, if the IP address range (expressed in Classless Inter-Domain Routing or CIDR format) 10.0.0.0/16 is designated for the IVN, and GVMs 212A and 212B are set up in a subnet 10.0.1.0/24, then GVM 212A and 212B may each be assigned a different address in the range 10.0.1.0-10.0.1.255. The addresses may be designated as "private" in the depicted embodiment because they are not (at least by default) advertised outside the IVN. It is noted that at least in some embodiments, a private IP address (as the term is used in this document) may not necessarily be compliant with some or all of the IETF (Internet Engineering Task Force) standards pertaining to address allocation for private networks, such as RFC (Requests for Comments) 1918 (for IP version 4) or RFC 4193 (for IP version 6).

Each GVM 212 may comprise one or more application processes 211 in the depicted embodiment, such as applications 211A, 211B, 211K or 211D. A given application such as 211A may generate messages to be set to other applications, such as 211L. Such an application message may be incorporated within one or more baseline network packets (such as packet 244A, in the case of application 211A) prepared by the networking software stack of the operating system at the GVM where the application runs. The baseline packet may, for example, indicate the private address of the sending GVM (e.g., PA-A) as the source IP address, and the private address of the intended recipient GVM (e.g., PA-L) as the destination IP address. The baseline packet may be transmitted by the low level components of the GVM's networking software stack via a virtual network interface associated with the GVM. The VMC 215 at the virtualization host where the GVM runs (e.g., VMC 215A, which may comprise a hypervisor and/or an administrative domain operating system), which acts as the intermediary between the GVM and hardware devices 225A, may intercept such a baseline packet 244A and include the contents of the baseline packet within an encapsulation packet 245A. As discussed earlier, an encapsulation protocol may be employed in the VCS because the addresses of the GVMs may have to be mapped to the addresses of the virtualization hosts at which the GVMs are instantiated for the transmission of the packets along the routes needed to reach their destinations. For example, VH 230A has a network interface card with host IP address HA-A, and VH 230B has a network interface card with host IP address HA-B, while the respective GVMs established at the hosts 230 have different IP addresses from the range selected by the customer. The VMC 215A may determine the route over which the encapsulation packet 245A should be sent using route tables 229A, network mappings 228A and/or other VCS networking configuration metadata (which may comprise identifiers/addresses of gateways and other devices, etc.). The network mappings 228A may include entries indicating the particular virtualization hosts (e.g., with host names and/or host IP addresses used as host identifiers) at which various GVMs (e.g., using GVM names, virtual interface names, and/or GVM IP addresses used as GVM identifiers) are instantiated. The encapsulation packet 245A packet may indicate VH 230A's host IP address HA-A as the source, and the targeted VH 230B's host IP address HA-B as the destination (although in some cases the destination address indicated in the encapsulation packet may be an address assigned to an intermediary device at which the address of VH 130B may be available). The encapsulation 245A may be transmitted along the appropriate route towards VH 230B, e.g., a route which may include various intermediary devices 285 such as routers, tunneling devices, etc.

The encapsulation packet 245A may eventually be received at the network interface card (one of the hardware components 225B) of virtualization host 230B. The encapsulation packet 245A may be processed by the VMC 215B. VMC 215B may unpack the contents of the encapsulation packet 245A and determine whether the network mappings 228B contain an entry which maps the source GVM of the baseline packet 244A to the source VH 230A. If such a mapping is found, packet 245A may be considered valid in the depicted embodiment; otherwise, the packet 245A may be dropped or discarded as invalid. If the encapsulation packet 245A is valid, the original baseline packet 244A extracted from it may be passed on to the GVM 212L at which the destination application 211L runs. Packets generated at the application 211L and intended for application 211A may follow the reverse path to that used for baseline packet 244A. For example, a baseline packet 244B (generated at GVM 212L) with a source IP address PA-L and destination IP address PA-A may be intercepted and encapsulated by VMC 215B using route tables 229B and/or network mappings 228B, and a corresponding encapsulation packet 245B may be prepared and transmitted using intermediary devices 285. That encapsulation packet 245B, with a HA-B as its source address and HA-A (or an intermediary device address) as its destination address, may eventually reach VH 230A. At VH 230A, VMC 215A may check whether network mapping database 228 includes an entry which identifies VH 230B as the host at which GVM 212L is instantiated. If such an entry is found, baseline packet 244B extracted from encapsulation packet 245B may be transferred to GVM 212A. It is noted that depending on the details of the encapsulation protocol being used, additional packet headers and/or packet body elements may be included in the encapsulation packets 245A and 245B. It is also noted that new or modified network mappings 228 (and/or other networking metadata including route tables 229) may be propagated asynchronously to different VMCs and other components of the VCS in at least some embodiments, so the contents of the network mappings databases 228 at different hosts may not be identical at a given point in time.

Live Migration Overview

Figure 3:
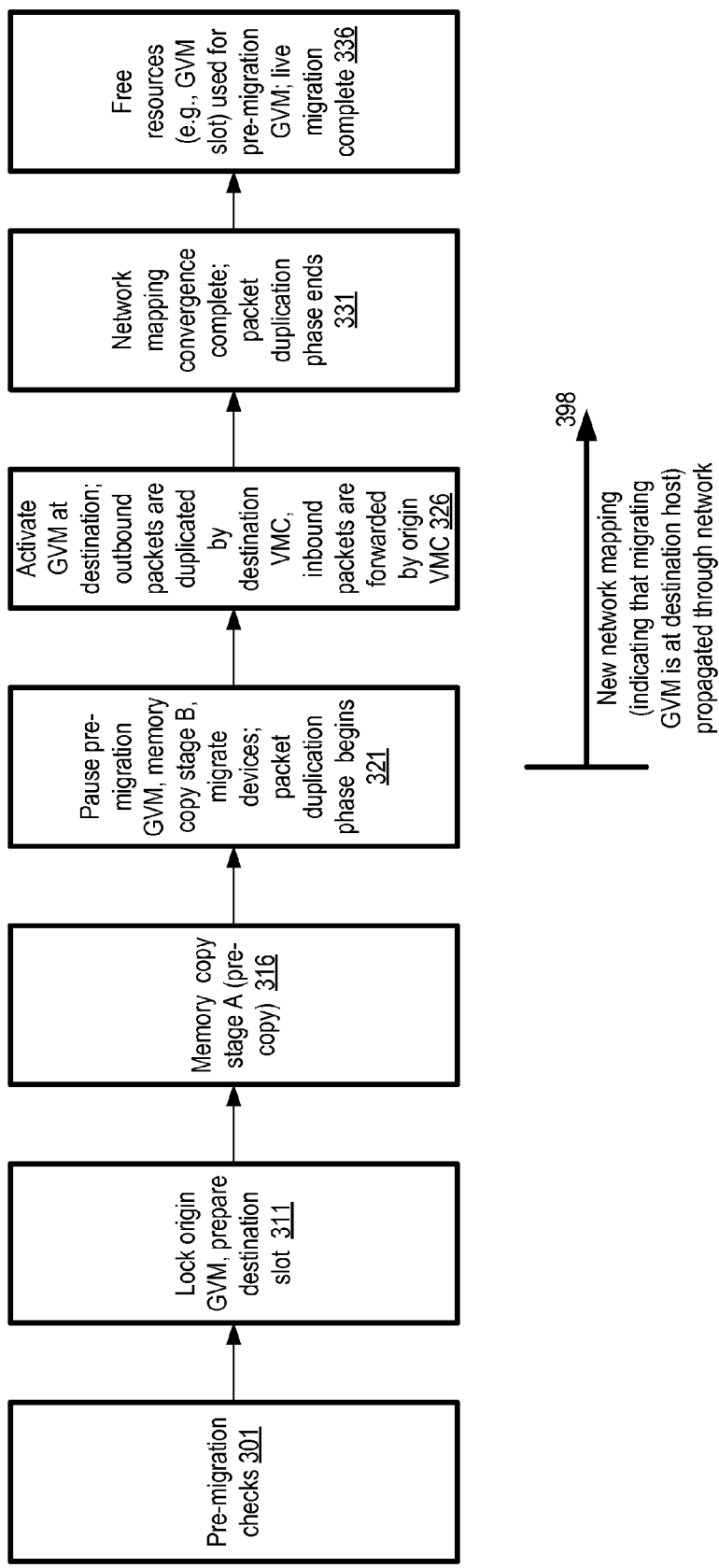
FIG. 3 provides an overview of a live migration procedure which may be implemented for a guest virtual machine, according to at least some embodiments.

FIG. 3 provides an overview of a live migration procedure which may be implemented for a guest virtual machine, according to at least some embodiments. The decision that a given GVM should be migrated to a different host without rebooting the GVM may be made for any of a number of reasons in various embodiments. In one embodiment, for example, control plane components of the VCS may monitor the utilization levels of various virtualization host resources (e.g., CPUs or cores, memory, storage devices, and/or networks) over time, and live migrations may be planned to help balance the utilization levels of different hosts. Live migrations may also be performed in some cases to coincide with hardware and/or software maintenance operations required at the migration-source virtualization hosts or at networking equipment, to try to debug intermittent or hard-to-diagnose problems, or in response to migration requests from clients on whose behalf GVMs are instantiated.

In a preliminary phase of the migration procedure, a number of pre-migration checks may be performed (element 301 of FIG. 3). Such checks may include, for example, verifying that an identified migration-destination virtualization host has the required resource capacity to support the migrating GVM, that the network configuration of the migration-destination is likely to be able to support similar or better network latency and throughput as the migration-source, and so on. If the migration-destination VH is found to be acceptable, the pre-migration version of the GVM may be locked (element 311) (e.g., to prevent client-issued configuration changes such as reboots, storage volume attachment/detachment, networking settings changes etc.) in the depicted embodiment, and the GVM slot to be used at the migration-destination VH may be prepared for instantiating the migrated VGM. A secure network connection may be established between the migration-source VMC and the migration-destination VMC. A number of configuration scripts may be run at the migration-source VMC and/or the migration-destination VMC during these stages of migration.

The migration-source VMC may start copying the contents of memory allocated to the pre-migration version of the GVM to the migration-destination VH. The memory may be copied in at least two stages in the depicted embodiment. During stage A (element 316), which may be called the "pre-copy" stage, a set of selected dirty memory portions or pages containing state information of the to-be-migrated GVM may be copied to the destination VH while the source GVM remains active. For example, all the dirty memory pages that a hypervisor has identified at a point in time T1 may be copied over. However, during this first step, some new portions of memory may be written to, since the pre-migration GVM remains running Thus, at least in some cases, a second iteration of copying may be required, which includes copying a second set of memory portions that were written to during the first iteration. Next, depending on the number of writes to the GVM's memory that occur during the second iteration, a third iteration may be required, and so on. These iterative copying steps may be expected to converge (that is, the amount of memory that has to be copied during a given iteration may in general tend to be smaller than the amount that was copied during a previous iteration) in most operating environments. At some point the combined size of the dirty memory portions to be copied may fall below a threshold, and stage A of the memory copy may be completed.

Next, operations at the pre-migration version of the GVM may have to be paused briefly (without rebooting the GVM) (element 321) to transfer or copy remaining state information without allowing ongoing changes to that state information in the depicted embodiment. The time during which the pre-migration GVM is paused and the post-migration GVM has not yet been activated may be called a "critical section" of the live migration, and one goal of live migration may be to minimize the duration of such a critical section. The state of various devices and network connection tracking entries may be copied, and any remaining dirty memory pages may be copied (stage B of the memory copy).

In the depicted embodiment, the packet duplication phase may be initiated (e.g., by the migration-source VMC and/or other control plane components of the VCS) at or near the time that the pre-migration version of the GVM is paused. Incoming encapsulation packets containing baseline packets directed to the migrating GVM may be queued at the migration-source VMC during in the packet duplication phase, and the migration-destination VMC may be notified to start duplicating encapsulation packets as soon as the migrated version of the GVM is activated and starts generating outbound packets. In at least some embodiments, a new network mapping indicating that the migrating GVM is instantiated at the migration-destination VH may be prepared and propagated to various virtualization hosts, routers, gateways, load balancers and/or other components of the VCS responsible for implementing the encapsulation protocol of the VCS, as indicated by arrow 398. The propagation of the new network mapping may be begun during the critical section phase of the migration in at least some embodiments; in other embodiments, the propagation may be begun after the migrated version of the GVM is activated.

After the required state information has been copied, the post-migration version of the GVM may be activated by the VMC at the migration-destination VH (element 326). The migration-source VMC may forward queued and/or newly-received encapsulation packets (containing baseline packets directed to the migrated GVM) to the migration-destination VH during the packet duplication phase in at least some embodiments. Corresponding to each outbound baseline packet generated at the migrated GVM, the migration-destination VMC may prepare a pair of duplicate encapsulation packets. One encapsulation packet of the pair may be sent to the virtualization host at which the baseline packet's destination GVM is instantiated, while the other may be sent to the migration-source VMC with a directive to forward it (after suitable header modifications) to the virtualization host at which the baseline packet's destination GVM is instantiated.

At some point after the migrated version of the GVM is activated, a triggering condition for ending packet duplication may be detected, e.g., by the migration-source GVM, the migration-destination GVM and/or other control plane components of the VCS. In some embodiments, for example, the packet duplication phase may be terminated after a configurable time interval has elapsed since the activation of the migrated version. In other embodiments the rate at which (misdirected) encapsulation packets containing baseline packets directed to the migrated GVM are received at the migration-source VMC may be tracked. When the rate of such misdirected packets falls below a threshold, indicating that the post-migration mapping for the GVM has reached enough of its intended recipients that the network mapping databases of the VCS have converged sufficiently, the packet duplication phase may be ended. The migration-destination GVM may be informed (or may determine) that the packet duplication phase has ended (element 331). Any remaining resources (e.g., the GVM slot at the migration-source VH) which remain allocated on behalf of the pre-migration version of the GVM may be freed at this stage (element 336), and the live migration procedure may be considered complete. It is noted that the relative timing of various events or operations performed during live migration may differ in different embodiments from that shown in FIG. 3: for example, a signal to initiate packet duplication may be sent to the migration-destination VMC slightly before the pre-migration version of the GVM is paused, at the time that the pre-migration GVM is paused, or shortly after the pre-migration GVM is paused in different embodiments. In some embodiments, the start of the propagation of the new mapping may trigger the packet duplication phase, while in other embodiments the completion of part A of the memory copy may trigger the packet duplication phase.

Inbound and Outbound Packet Paths for Migrating GVM

Figure 4:
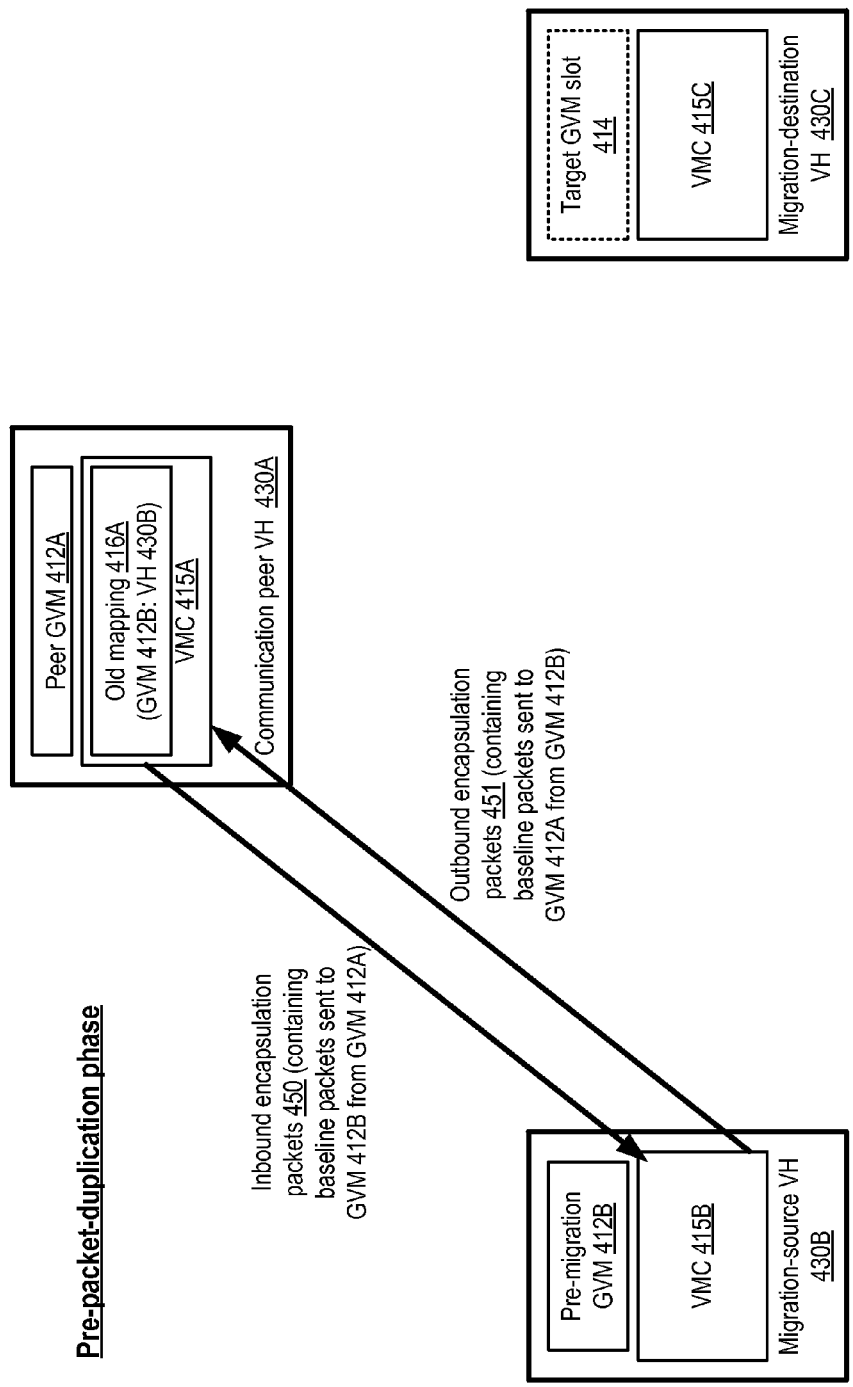
FIG. 4-FIG. 8 collectively illustrate paths used for inbound and outbound packets of a guest virtual machine during various stages of a live migration of the guest virtual machine, according to at least some embodiments.

FIG. 4-FIG. 8 collectively illustrate paths used for inbound and outbound packets of a guest virtual machine during various stages of a live migration of the guest virtual machine, according to at least some embodiments. In FIG. 4, inbound and outbound packet pathways with respect to the GVM to be migrated are shown prior to the packet duplication phase of live migration. The GVM 412B which is to be migrated is instantiated at migration-source virtualization host (VH) 430B with VMC 415B. The migration-destination VH 430C contains an empty slot 414 to be used for the GVM 412B. GVM 412B has established network connectivity to a peer GVM 412A running at communication peer VH 430A with VMC 415A. VMC 415A prepares and sends inbound encapsulation packets 450 to VH 430B, containing the baseline packets generated at GVM 412A for GVM 412B; similarly, VMC 415B prepares and transmits outbound encapsulation packets 451 to VH 430A containing baseline packets generated at GVM 412B for GVM 412A. When an encapsulated packet 450 is received at VMC 415B, VMC 415B validates and accepts the packet if a mapping between the sender GVM 412A and the sender VH 430A exists in VMC 415B's network mapping database; if no such mapping is found, the encapsulation packet may be rejected. Similarly, VMC 415A validates received encapsulation packets 451 using its network mapping database, accepting packets only if a mapping 416A (designated as the "old" mapping in FIG. 4) between the sender GVM 412B and the sender VH 430B is found. The baseline packets are extracted from the received encapsulation packets at the respective VMCs, and provided to the GVMs.

Figure 5:
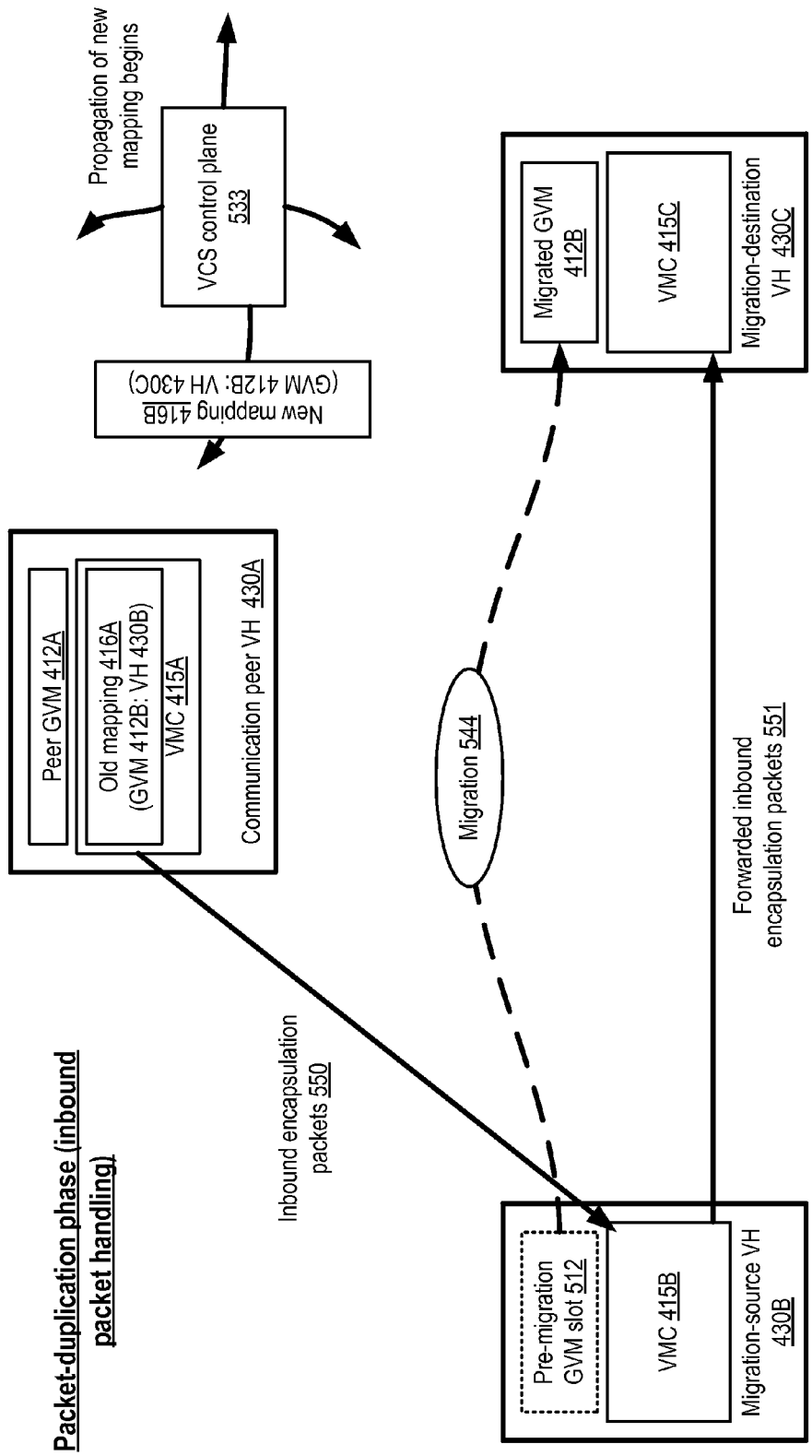

In the scenario depicted in FIG. 5, the migrated version of GVM 412B has been activated at migration-destination VH 430C (as indicated by the arrow labeled migration 544), and the packet duplication phase of the migration has begun (e.g., because a triggering condition to initiate packet duplication has been detected by VMC 415B or by some other component of VCS control plane 533). The propagation of the new mapping 416B (indicating that GVM 412B is now instantiated at VH 430C) to various entities of the VCS has also begun, but the new mapping 416B has not yet been received at VH 430A. VMC 415A, which has not yet learned that GVM 412B has been migrated to VH 430C, continues to send inbound encapsulation packets 550 (which contain baseline packets to be delivered to GVM 412B) to VH 430B. When VMC 415B receives a particular encapsulation packet 550 at VH 430B, VMC 415B determines that the packet should be forwarded to VH 430C. One or more headers of the corresponding forwarded inbound encapsulation packet 551 may be set to indicate that the source VH of the packet is VH 430A, so that when VMC 415C receives the forwarded encapsulation packet, it is able to validate the packet using a network mapping indicating that GVM 412A is instantiated at VH 430A. VMC 415C extracts the baseline packet from the forwarded inbound encapsulation packet, and provides it to GVM 412B. The pre-migration GVM's slot 512 has not yet been freed at VH 430B.

Figure 6:
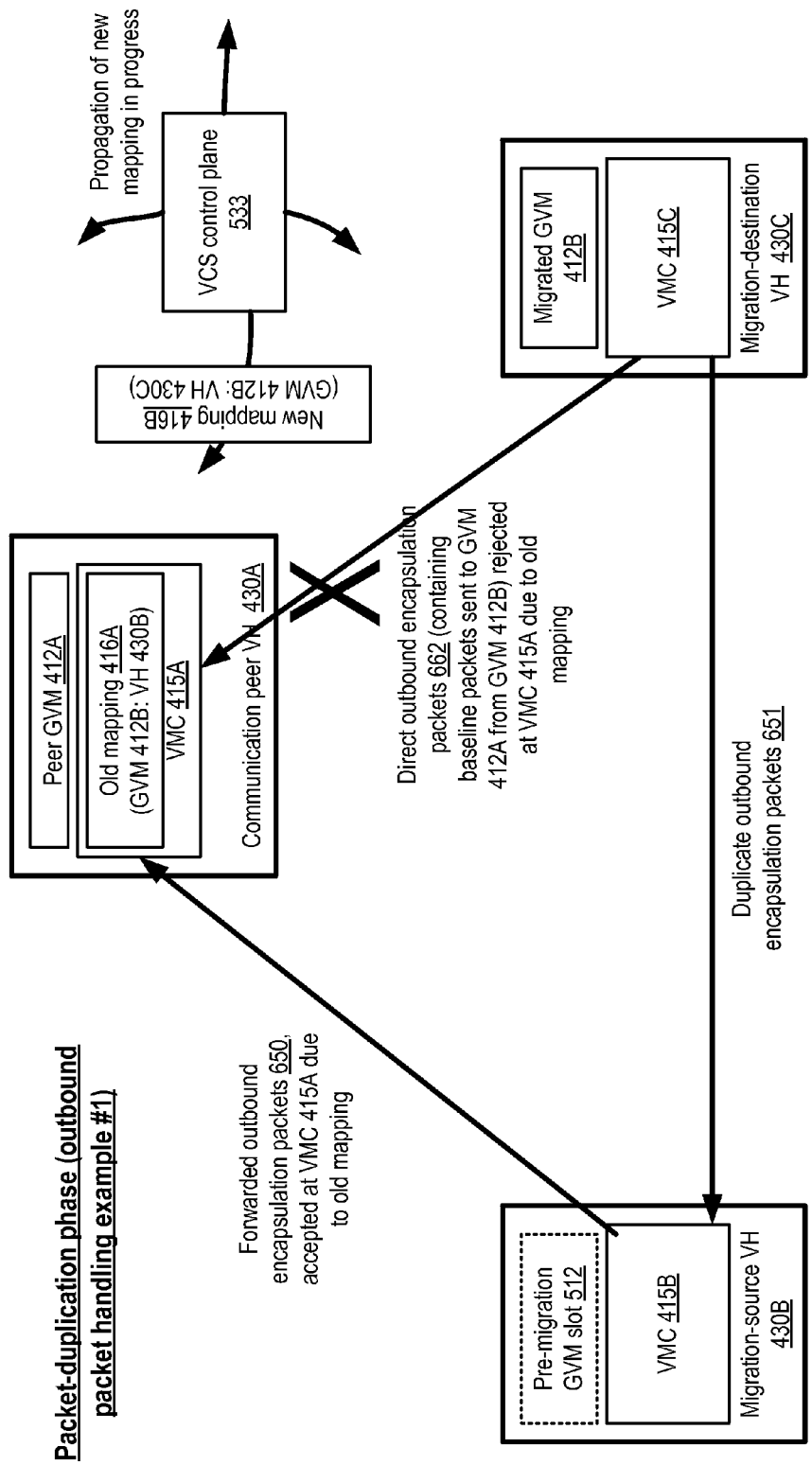

When the migrated GVM 412B generates a baseline packet directed to GVM 412A (e.g., either in response to a packet received from GVM 412A, or independently of any received packets), the migration-destination VMC 415C prepares two encapsulation packets. One of the two encapsulation packets is sent directly (i.e., without the participation of migration-source VH 430B) to VH 430A, as indicated in FIG. 6, while the second or duplicated outbound encapsulation packet 651 is sent to migration-source VH 430B with a directive to forward the packet to VH 430A after modifying headers appropriately. (It is noted that the term "direct", when applied to an outbound encapsulation packet 662, indicates only that such a packet is not sent to or manipulated at migration-source VH 430B, and does not limit the number of network hops or intermediaries encountered between VH 430C and VH 430A.) In the state illustrated in FIG. 6, the packet duplication phase is still in progress, and new mapping 416B has still not reached VH 430A at the time that a direct outbound encapsulation packet 662 is received. As a result, the direct outbound encapsulation packet 662 is rejected (as indicated by the "X" symbol). In contrast, the forwarded version 650 of the duplicate outbound packet 651, whose headers (modified by VMC 415B) indicate that it was prepared at VH 430B, is accepted as valid by VMC 415A on the basis of old mapping 416A. The baseline packet contained in such a forwarded outbound encapsulation packet 650 may be extracted by VMC 415A and passed on to the destination GVM 412A.

Figure 7:
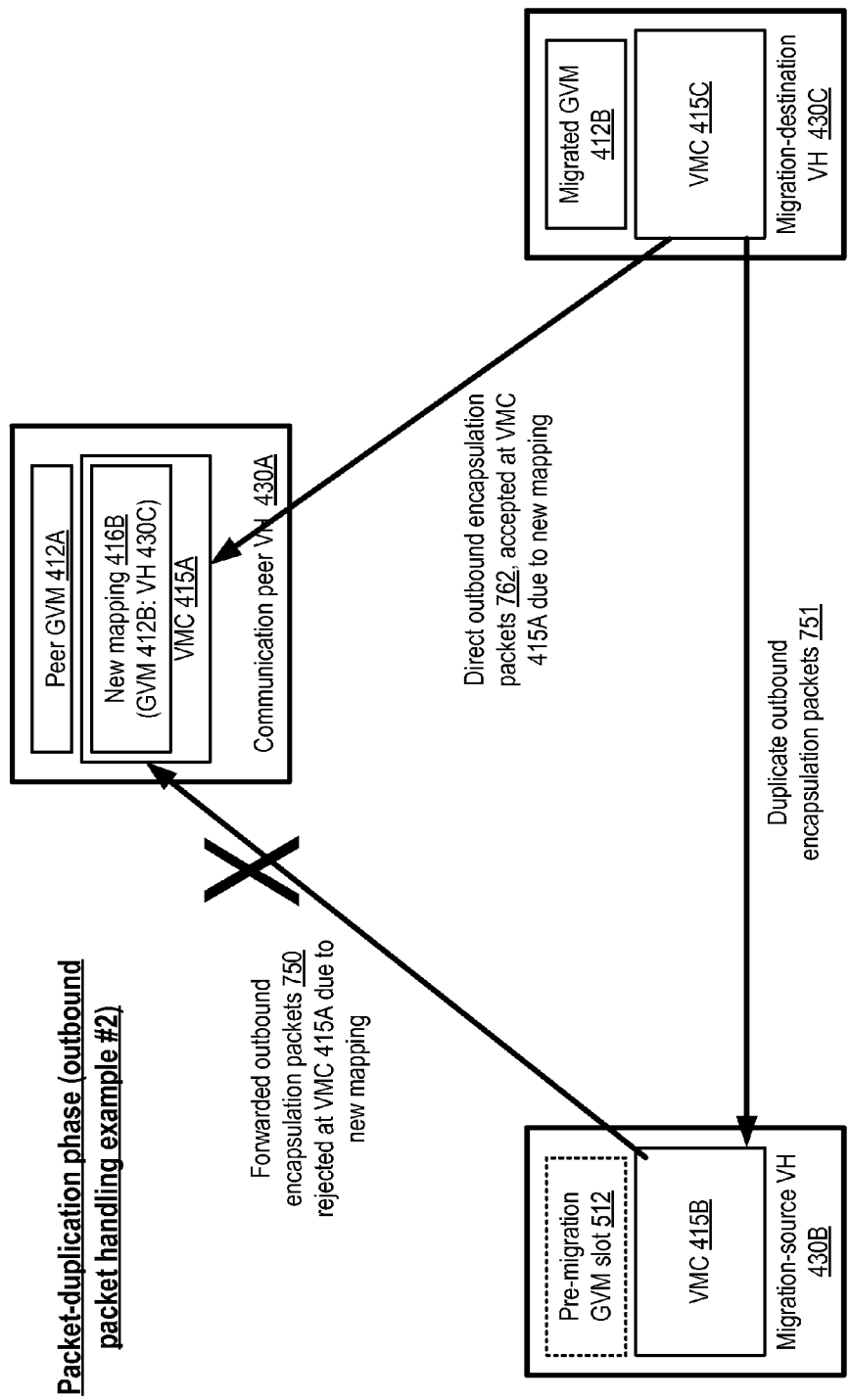

FIG. 7 illustrates a scenario in which the new mapping 416B has reached VH 430A during the packet duplication phase. The migration-destination VMC 415C continues to prepare two outbound encapsulation packets for a given outbound baseline packet generated at migrated GVM 412B for GVM 412A. Because the new mapping 416B has overridden or replaced the old mapping 416A, it is the direct outbound encapsulation packets 762 which are accepted as valid at VMC 415A, while the forwarded outbound encapsulation packets 750 corresponding to the duplicate outbound encapsulation packets 751 which are rejected at VMC 415A.

Figure 8:
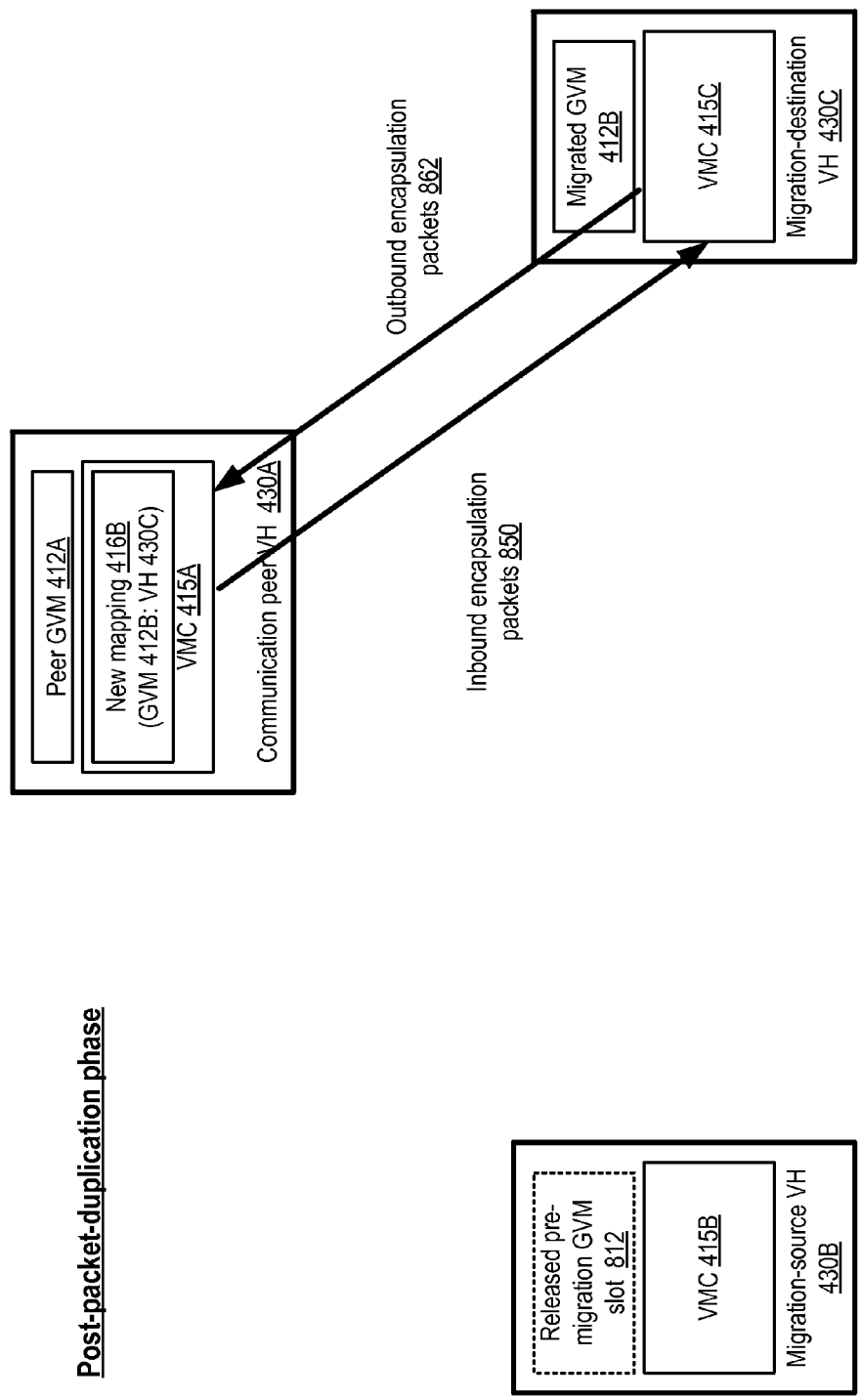

Eventually, the triggering conditions for terminating packet duplication may be detected (e.g., by either the migration-source VMC 415B, the migration-destination VMC 415C, or by some other component of the VCS control plane). As shown in FIG. 8, after VMC 415C has determined that the packet duplication phase is over, it may generate only a single outbound encapsulation packet 862 for each outbound baseline packet, and send it to the communication peer VH 430A on a path which does not require forwarding via migration-source VH 430B. The outbound encapsulation packets may be validated using network mapping 416B, which indicates that the migrated GVM 412B is resident at VH 430C. Inbound encapsulation packets 850 generated by VH 415A may be sent to migration-destination VH 430C directly (i.e., without the help of VH 430B). Resources (such as the slot 812 which was used for GVM 412B at VH 430B) that were reserved for the pre-migration version of GVM 412B may be released in the depicted embodiment.

Methods for Live Migration Using Packet Duplication

Figure 9:
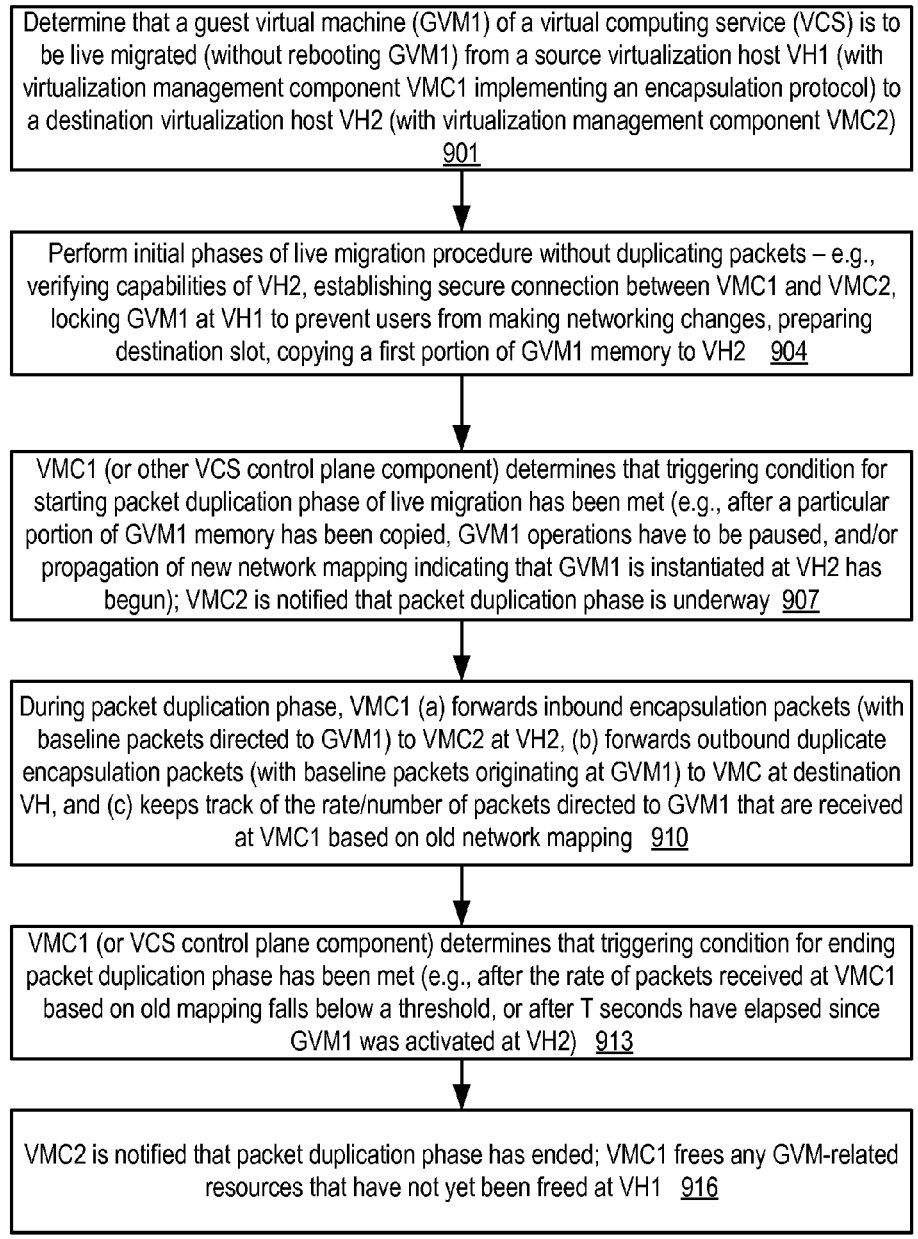
FIG. 9 is a flow diagram illustrating aspects of operations that may be performed by a virtualization management component at a virtualization host from which a guest virtual machine is live migrated, according to at least some embodiments.

FIG. 9 is a flow diagram illustrating aspects of operations that may be performed by a virtualization management component at a virtualization host from which a guest virtual machine is live migrated, according to at least some embodiments. As shown in element 901, a determination may be made, e.g., by control plane components of a virtualization computing service (VCS), to migrate a particular guest virtual machine GVM1 without rebooting GVM1 and without requiring at least some application processes running on GVM1 to be shut down. Such a migration, which may be termed a "live" migration, may transfer GVM1 from a migration-source virtualization host VH1 to a migration-destination virtualization host VH2. At each of the virtualization hosts, a respective virtualization management component (VMC) such as a hypervisor and/or an operating system instance running in a privileged domain may be responsible for implementing an encapsulation protocol which relies at least in part on the use of network mappings which indicate the virtualization hosts at which various GVMs are instantiated. Control plane components of the VCS may be responsible for distributing/propagating network mappings to the virtualization hosts and/or to other encapsulation intermediaries of the VCS (i.e., entities responsible for implementing the encapsulation protocol, such as various routers, load balancers, gateways, and the like) as needed, e.g., when new GVMs are instantiated or GVMs are migrated from one host to another. The VMCs may be considered examples of encapsulation intermediaries as well, as they are responsible for intercepting outbound baseline packets and generating corresponding encapsulation packets, and for intercepting inbound encapsulation packets and extracting the baseline packets contained therein.

The live migration procedure used in the depicted embodiment may comprise several stages. Some early stages of the procedure may be performed without duplicating encapsulation packets (element 904), while outbound encapsulation packets from the migration-destination host may be duplicated during at least a portion of the procedure. The early stages may include, for example, verifying the capabilities of the migration-destination VH, establishing secure connection between VMC1 and VMC2, locking the state of GVM1 to prevent certain types of configuration changes, preparing or configuring the GVM slot at the migration-destination VH2, and copying contents of at least a portion of memory allocated to GVM1 from VH1 to VH2.

VMC1, or some other control plane component of the VCS, may detect that a triggering condition for initiating packet duplication has been met (element 907), and inform VMC2 that the packet duplication phase has begun. Any of a number of conditions may trigger the packet duplication phase, such as for example the completion of a particular phase of memory copying from VH1 to VH2, the pausing of one or more types of operations at the pre-migration GVM1, the activation of GVM1 at VH2, the beginning of the propagation of the new network mapping indicating that GVM1 is instantiated at VH2, and so on.

During the packet duplication phase, VMC1 may perform at least some of the following operations in the depicted embodiment (element 910). If and when an inbound encapsulation packet (containing a baseline packet intended for GVM1) is received at VMC1 from a different network endpoint (such as a third VH), that packet may be forwarded to VMC2 at VH2. At least in some embodiments, the packet may be forwarded after VMC1 makes header changes necessary to indicate that the forwarded encapsulation packet is being sent from the different network endpoint rather than from VH1. If VMC1 receives an outbound encapsulation packet from VH2, containing a directive to forward the outbound encapsulation packet to a specified destination (such as a third VH), VMC1 may implement the directive and send a version of the outbound encapsulation packet (with one or more headers modified to make it appear that the encapsulation packet was generated at VH1) towards its intended destination. Furthermore, in at least some embodiments, VMC1 may track the rate at which it receives inbound encapsulation packets containing baseline packets directed to GVM1. Such inbound encapsulation packets may have been set to VH1 because the updated network mapping indicating the migration of GVM1 may not yet have reached the encapsulation intermediaries at which the packets were prepared, so the older network mapping which indicated that GVM1 is running on VH1 may have been used to prepare the inbound encapsulation packets. As more and more of the encapsulation intermediaries receive the updated mapping for GVM1, the rate at which such misdirected inbound packets are received at VH1 may be reduced.

A triggering condition for terminating the packet duplication phase may eventually be detected (element 913), e.g., by VMC1, VMC2 or some other control plane component of the VCS. The packet duplication phase may be terminated, for example, because a configurable time period has elapsed since the migrated version of GVM1 was activated, because the rate at which inbound misdirected packets are received has fallen below a threshold, or for other reasons in various embodiments. After both the source and destination VMCs have determined or been informed that the packet duplication phase is over, any resources that were being used for the pre-migration version of GVM1 at VH1 (such as memory or other resources associated with GVM1's slot) may be released in the depicted embodiment (element 916).

Figure 10:
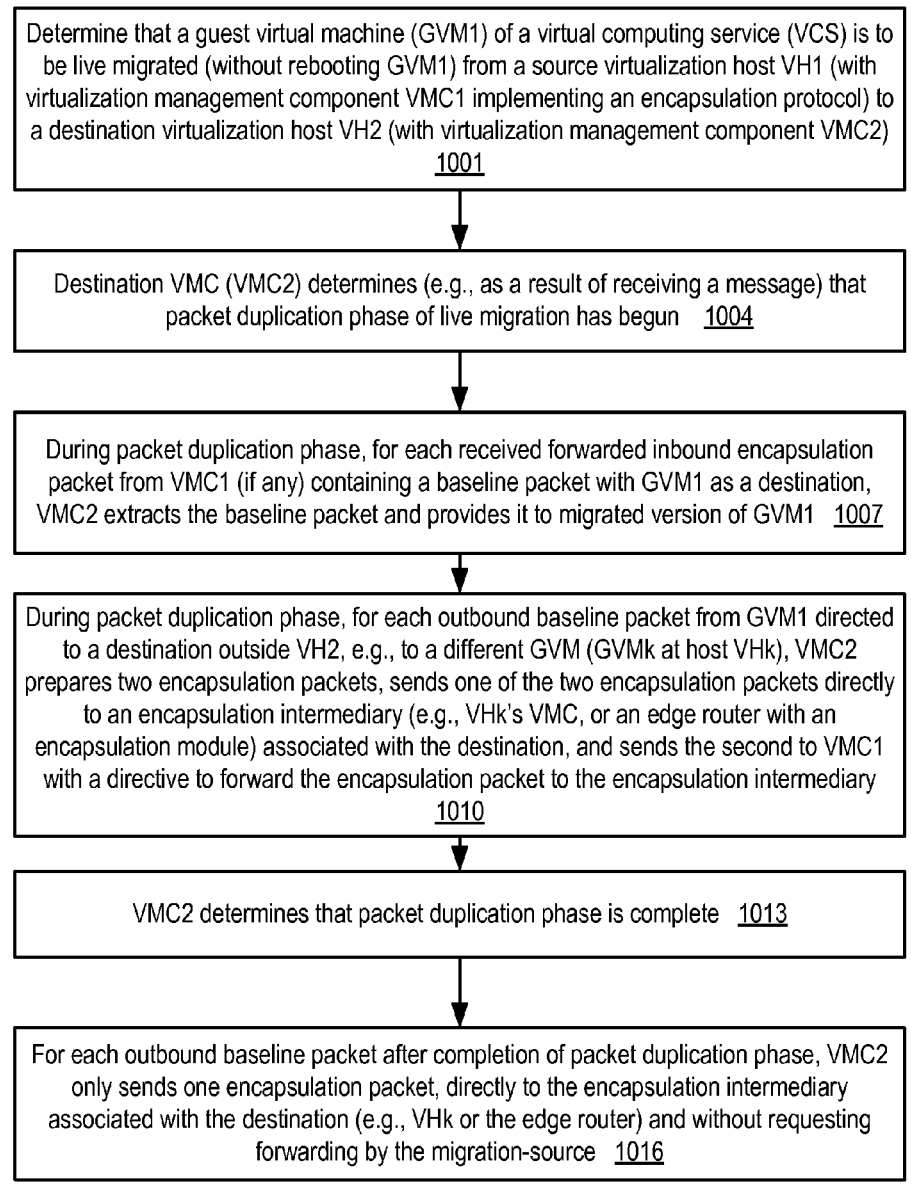
FIG. 10 is a flow diagram illustrating aspects of operations that may be performed by a virtualization management component at a virtualization host to which a guest virtual machine is live migrated, according to at least some embodiments.

FIG. 10 is a flow diagram illustrating aspects of operations that may be performed by a virtualization management component at a virtualization host to which a guest virtual machine is live migrated, according to at least some embodiments. As shown in element 1001, a determination may be made (e.g., by control plane components of a VCS) that a particular GVM (GVM1) is to be migrated without rebooting from a migration-source virtualization host (VH1) to a migration-destination virtualization host (VH2). Each of the virtualization hosts VH1 and VH2 may comprise a respective virtualization management component (e.g., VMC1 at VH1, and VMC2 at VH2) responsible for, among other functions, implementing an encapsulation protocol for network packets directed to or from the GVMs at their VHs and acting as intermediaries between the GVMs and hardware components associated with the VHs. The decision to migrate GVM1 may be made based on any of a variety of factors and reasons as discussed earlier, e.g., for workload balancing, to enable maintenance operations to be performed at the VH1, etc. The migration procedure may comprise a number of stages or phases, e.g., similar as those discussed in the context of FIG. 3.

At some point during the migration, a triggering condition indicating that a packet duplication phase of the migration is to be begin may be detected (e.g., by VMC1, VMC2 or by some other control plane components of the VCS). In some embodiments, VMC2 may receive an indication or a confirmation, such as a message from VMC1 or the control plane component, that packet duplication is to commence (element 1004); in other embodiments, VMC2 may itself determine when to start duplicating outbound packets, e.g., without having to receive an indication from elsewhere. During the packet duplication phase in the depicted embodiment, if VMC2 intercepts an inbound encapsulation packet (e.g., received from and/or forwarded by VMC1 to VH2) containing a baseline packet directed to GVM1, VMC2 may extract the baseline packet and provide the extracted packet to the migrated version of GVM1 which is instantiated at VH2 (element 1007).

Also during the packet duplication phase, VMC2 may detect that a baseline packet directed to a destination outside VH2 has been generated at the migrated version of GVM1 instantiated at VH2 (element 1010). The baseline packet may, for example, be directed to a different GVM (GVMk) running at a third host VHk with its own VMC VMCk, or may be targeted towards an address outside the VCS such as an endpoint of a service other than the VCS, a device located within client-owned premises, or a device accessible via a public Internet address or path. Corresponding to each such baseline packet, VMC2 may prepare or generate two different encapsulation packets in the depicted embodiment. Each of the two encapsulation packets may comprise the baseline packet, and may therefore be referred to as a duplicate of the other, even though one or more header values may differ among the two encapsulation packets. One of the encapsulation packets may be sent directly to an encapsulation intermediary associated with the baseline packet's destination (e.g., VMCk, in the case that the destination is GVMk within the VCS, or an edge router's encapsulation component in the case that the destination is outside the VCS). The second encapsulation packet may be sent to VMC1, and may include a directive or a set of instructions that at least a portion of the contents of the second encapsulation packet are to be forwarded from VH1 to the encapsulation intermediary associated with the destination. It is noted that it may be the case that a baseline packet generated at the migrated version of GVM1 may be directed to another GVM instantiated at VH2 itself, in which case packet duplication may not be required in various embodiments; such a baseline packet may simply be delivered to the local destination GVM.

During the packet duplication phase, VMC2 may prepare and transmit a pair of encapsulation packets corresponding to each outbound baseline packet generated at the migrated version of GVM1 and targeted outside VH2. Eventually VMC2 may determine (e.g., as a result of a received message, or on its own) that the packet duplication phase is terminated (element 1013). Subsequently, VMC2 may prepare only a single encapsulation packet corresponding to each outbound baseline packet, and transmit it to the encapsulation intermediary associated with the baseline packet's destination directly, without requesting forwarding by VMC1 (element 1016).

Figure 11:
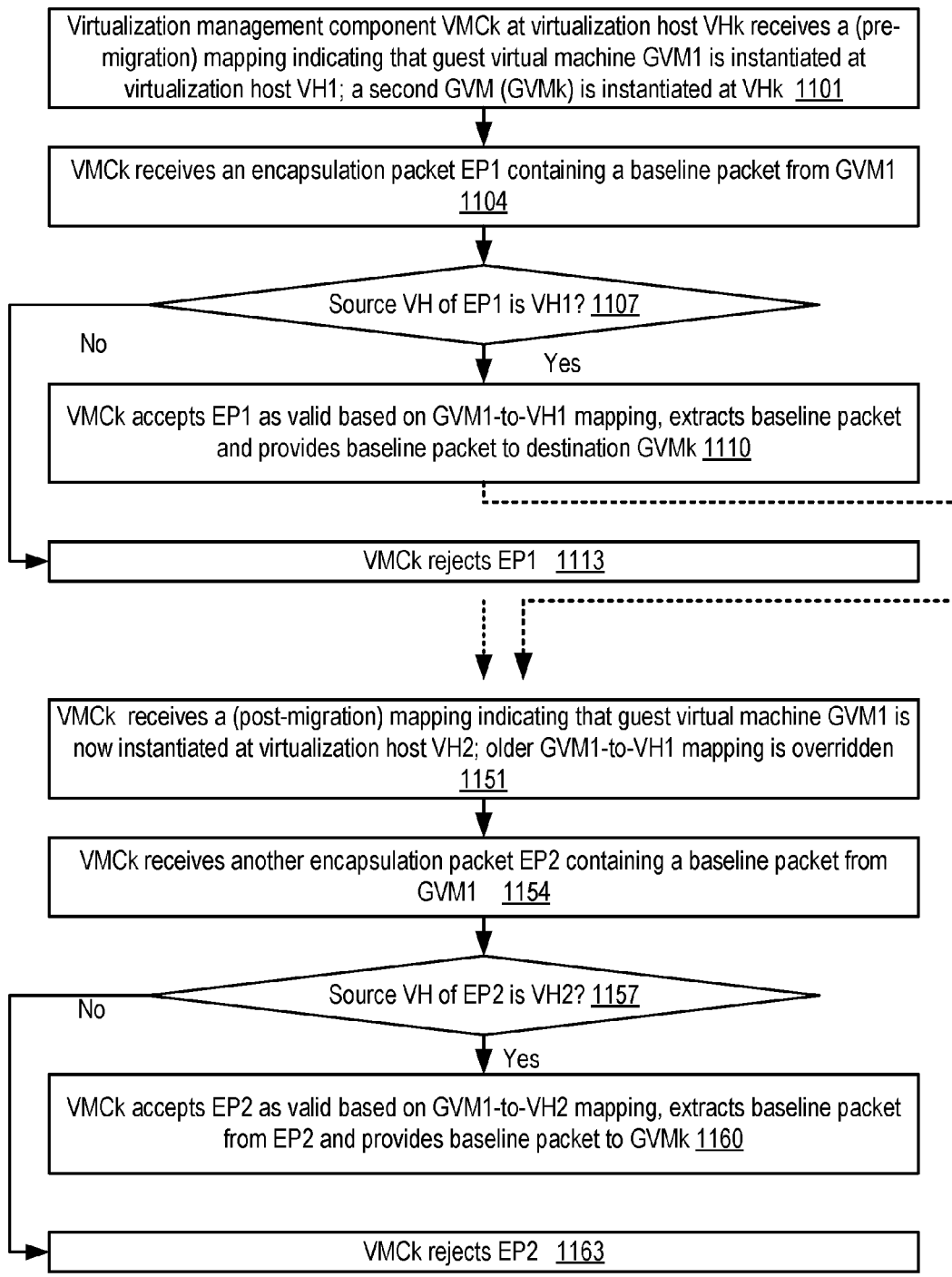
FIG. 11 is a flow diagram illustrating aspects of operations that may be performed by a virtualization management component at a virtualization host at which a particular guest virtual machine which communicates with a migrating guest virtual machine is instantiated, according to at least some embodiments.

FIG. 11 is a flow diagram illustrating aspects of operations that may be performed by a virtualization management component at a virtualization host at which a particular guest virtual machine which communicates with a migrating guest virtual machine is instantiated, according to at least some embodiments. Along with various other entities of the VCS which are responsible for implementing at least a portion of the VCS's encapsulation protocol for network packets directed to/from various GVMs, such a virtualization management component (VMCk of host VHk) may receive network mappings as they are propagated in the depicted embodiment, e.g., from one or more control plane components of the VCS. Each such mapping may indicate, for example the particular VH at which a given GVM (or a set of GVMs) is resident or instantiated; such GVM-to-host mappings may be stored in a local network mapping database of VMCk at VHk. As shown in element 1101, prior to the live migration of a guest virtual machine GVM1 from a migration-source virtualization host VH1 to a migration-destination host VH2 (e.g., at or shortly after the time when GVM1 is launched at the migration-source host VH1) VMCk may receive a GVM-to-host mapping indicating that GVM1 is instantiated at a migration-source host VH1. A particular GVM (GVMk) instantiated at host VHk may have established connectivity (e.g., using any desired network protocol such as TCP or UDP) with the live migrating GVM (GVM1).

After receiving the pre-migration mapping, at some point VMCk may receive an inbound encapsulation packet EP1 comprising a baseline packet generated by GVM1 (element 1104). VMCk may examine one or more headers of EP1, determine that EP1 appears to be from GVM1, and look up the GVM-to-host entry for GVM1 in the network mapping database. To determine whether EP1 is to be considered valid, VMCk may check whether EP1's headers indicate that the source VH of EP1 is VH1. If the source VH is VH1 (as detected in element 1107), EP1 may be accepted as valid based on the match between the mapping (which indicates that GVM1 is instantiated at VH1) and the source VH information contained in EP1's own headers (element 1107). The baseline packet extracted from EP1 may be provided to its intended destination, GVMk. If there is a mismatch between the GVM-to-host mapping for GVM1 in VMCK's database (e.g., if EP1 indicates that its source VH is not VH1), EP1 may be rejected and discarded in the depicted embodiment (element 1113).

The live migration of GVM1 from VH1 to VH2 may be initiated, and a new GVM-to-host mapping indicating that GVM1 is instantiated at VH2 may be propagated (e.g., asynchronously with respect to the live migration phases) to VMCk and other VCS components in the depicted embodiment. VMCk may eventually receive the new post-migration mapping (element 1151). The new mapping may override or replace the pre-migration mapping which indicated that GVM1 was instantiated on the migration-source VH1. After the old mapping has been overridden by the new mapping, another encapsulation packet EP2 containing a baseline packet generated at GVM1 may be received at VMCk (element 1154). If EP2 indicates that its source VH is VH2 (as detected in operations corresponding to element 1157), EP2 may be accepted as valid, and the baseline packet contained in EP2 may be extracted and passed to the destination GVMk (element 1160). Otherwise, if the received encapsulation packet's headers indicate some other VH (other than VH2) as the source VH, EP2 may be rejected and/or discarded (element 1163).

It is noted that in various embodiments, some of the operations shown in the flow diagrams of FIG. 9, FIG. 10 and FIG. 11 may be implemented in a different order than that shown in the figure, or may be performed in parallel rather than sequentially. For example, in some embodiments an outbound packet may be generated by the migrated version of a GVM before an inbound packet directed to that GVM is received, in which case at least some operations corresponding to element 1007 may be performed before some operations corresponding to element 1010. Additionally, some of the operations shown in one or more of the flow diagrams may not be required in one or more implementations.

Use Cases

The techniques and algorithms described above, of duplicating and forwarding packets during some time intervals associated with live migration of a guest virtual machine from one host of a virtual computing service to another host, may be useful in a variety of environments. In some large provider network environments at which such a VCS is implemented, mappings between GVMs and hosts may have to be propagated among a large number (e.g., tens of thousands) of hosts, routers and/or other devices. Entities which have not yet received the updated mapping reflecting the post-migration location of a GVM may direct packets to the wrong destinations (e.g., to the migration-source host instead of to the migration-destination host, even after the GVM has been activated at the migration-destination host), and/or drop packets which appear to have been generated at the wrong host (e.g., the migration-destination host) but should actually be considered legitimate. As a result of duplicating and forwarding packets temporarily as described, much or all of the traffic between a migrating or recently-migrated GVM and various endpoints with which the GVM has connectivity established may continue to flow without perceptible interruptions, even if it takes a while for the updated mapping to be propagated to all the entities where it is used.

Illustrative Computer System

Figure 12:
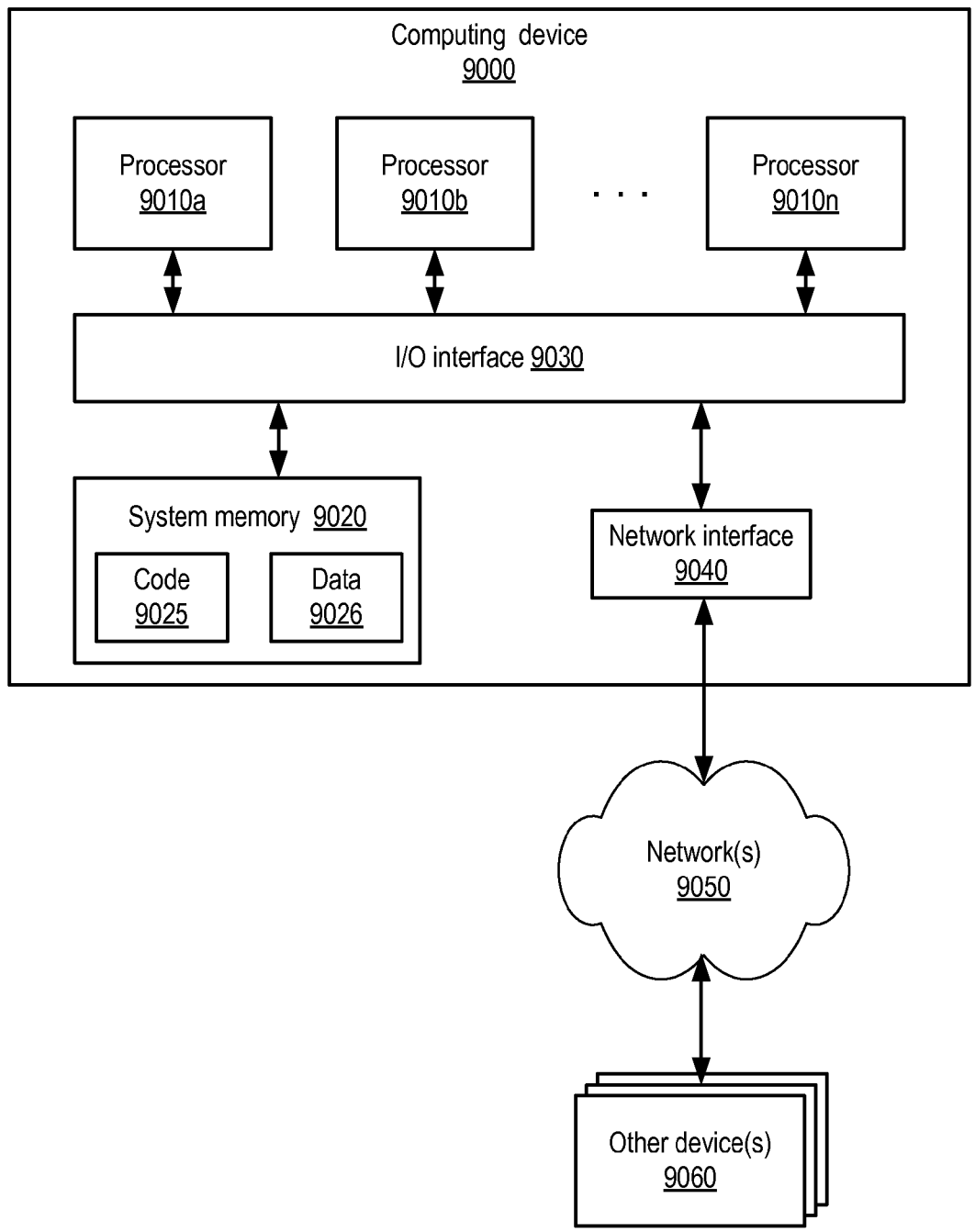
FIG. 12 is a block diagram illustrating an example computing device that may be used in at least some embodiments.

In at least some embodiments, a server that implements one or more of the techniques described above for live migration of virtual machines, including virtualization hosts, control plane or data plane components of a virtual computing service, edge routers and the like, may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
   transmitting, by a first virtualization management component of a first virtualization host of a virtual computing service, an indication to a second virtualization management component of a second virtualization host that a packet duplication phase of a migration procedure for a particular guest virtual machine being migrated to the second virtualization host from the first virtualization host has begun, wherein the migration procedure does not include a reboot of the particular guest virtual machine;

in response to determining, by the second virtualization management component during the packet duplication phase, that a migrated version of the particular guest virtual machine instantiated at the second virtualization host has generated a first baseline packet directed to a different guest virtual machine instantiated at a third virtualization host, transmitting: (a) a first encapsulation packet comprising the first baseline packet from the second virtualization host to the third virtualization host and (b) a second encapsulation packet comprising the first baseline packet from the second virtualization host to the first virtualization host;

in response to receiving, at the first virtualization management component, the second encapsulation packet, forwarding a transformed version of the second encapsulation packet to a third virtualization management component of the third virtualization host;

in response to (a) receiving, at the third virtualization management component, the first encapsulation packet and (b) determining, at the third virtualization management component, that a network mapping database of the third virtualization host does not include a mapping indicating that the particular guest virtual machine is instantiated at the second virtualization host, discarding the first encapsulation packet by the third virtualization management component; and in response to (a) receiving, at the third virtualization management component, the transformed version of the second encapsulation packet and (b) determining, at the third virtualization management component, that the network mapping database includes a mapping indicating that the particular guest virtual machine is instantiated at the first virtualization host,
extracting the first baseline packet from the transformed version; and
providing the first baseline packet to the different guest virtual machine.

2. The method as recited in claim 1, further comprising:
receiving, at the third virtualization management component after said providing, a new mapping indicating that the particular guest machine is instantiated at the second virtualization host;
replacing, with the new mapping, at the third virtualization management component, the mapping indicating that the particular guest virtual mapping is instantiated at the first virtualization host; and
determining, at the third virtualization management component, based at least in part on the new mapping, that a second baseline packet is to be extracted from a third encapsulation packet received at the third virtualization management component from the second virtualization host.

3. The method as recited in claim 1, wherein the transformed version of the second encapsulation packet indicates that the first baseline packet was generated at the first virtualization host.

4. The method as recited in claim 1, further comprising:
in response to determining, by the second virtualization management component during the packet duplication phase, that a migrated version of the particular guest virtual machine instantiated at the second virtualization host has generated a second baseline packet directed to a particular destination external to the virtual computing service, transmitting: (a) a third encapsulation packet comprising the second baseline packet from the second virtualization host to an edge router of the virtual computing service and (b) a fourth encapsulation packet comprising the second baseline packet from the second virtualization host to the first virtualization host;

in response to receiving, at the second virtualization management component, the fourth encapsulation packet, forwarding a transformed version of the fourth encapsulation packet to the edge router of the third virtualization host;

in response to (a) receiving, at an encapsulation intermediary component of the edge router, the third encapsulation packet and (b) determining, at the encapsulation intermediary component, that a network mapping database of the edge router does not include a mapping indicating that the particular guest virtual machine is instantiated at the second virtualization host, discarding the third encapsulation packet by the encapsulation intermediary component; and in response to (a) receiving, at the encapsulation intermediary component, the transformed version of the fourth encapsulation packet and (b) determining, at the encapsulation intermediary component, that the network mapping database of the edge router includes a mapping indicating that the particular guest virtual machine is instantiated at the first virtualization host, transmitting at least a portion of the second baseline packet to the particular destination.

5. The method as recited in claim 1, further comprising:
assigning, by one or more components of the virtual computing service, to the particular guest virtual machine prior to migration of the particular guest virtual machine, a particular network address selected from a range of network addresses of an isolated virtual network of the virtual computing service, wherein the particular network address is not advertised outside the isolated virtual network, and wherein the particular guest virtual machine retains the particular network address after migration to the second virtualization host.

6. A system, comprising:
a plurality of virtualization hosts of a virtual computing service, including a first virtualization host comprising a first virtualization management component, a second virtualization host comprising a second virtualization management component, and a third virtualization host comprising a third virtualization management component;

wherein the second virtualization management component is configured to:
transmit, during a packet duplication phase of a migration of a particular guest virtual machine from the first virtualization host to the second virtualization host: (a) a first encapsulation packet to the third virtualization host, wherein the first encapsulation packet comprises a first baseline packet generated by a migrated version of the particular guest virtual machine, and wherein the first baseline packet is directed to a different guest virtual machine instantiated at the third virtualization host and (b) a second encapsulation packet to the first virtualization host, wherein the second encapsulation packet comprises the first baseline packet; and wherein the third virtualization management component is configured to:

based at least in part on an examination of a particular mapping database comprising one or more virtual-machine-to-host mappings, designate, as a valid encapsulation packet, one of: (a) the first encapsulation packet, or (b) a forwarded version of the second encapsulation packet transmitted by the first virtualization management component to the third virtualization host; and provide, to the different guest virtual machine, the first baseline packet after extracting the first baseline packet from the valid encapsulation packet.

7. The system as recited in claim 6, further comprising a control plane component implemented at one or more computing devices of the virtual computing service, wherein the control plane component is configured to:

prior to initiation of the migration of the particular guest virtual machine, transmit, to one or more destinations including the third virtualization management component, a first virtual-machine-to-host mapping indicating that the particular guest virtual machine is instantiated at the first virtualization host; and after instantiation of the migrated version of the particular guest virtual machine at the second virtualization host, transmit, to the one or more destinations, a second virtual-machine-to-host mapping overriding the first virtual-machine-to-host mapping, wherein the second virtual-machine-to-host mapping indicates that the particular guest virtual machine is instantiated at the second virtualization host.

8. The system as recited in claim 7, wherein the one or more destinations include an edge router of the virtual computing service, wherein the edge router is responsible for (a) routing network packets generated within the virtual computing service towards endpoints outside the virtual computing service and (b) routing network packets generated outside the virtual computing service towards guest virtual machines of the virtual computing service.

9. The system as recited in claim 6, wherein the third virtualization management component is configured to:

in response to determining, after receiving the first encapsulation packet, that the particular mapping database does not include a virtual-machine-to-host mapping indicating that the particular guest virtual machine is instantiated at the second virtualization host, discard the first encapsulation packet as an invalid encapsulation packet.

10. The system as recited in claim 6, wherein the third virtualization management component is configured to:

in response to determining, after receiving the forwarded version of the second encapsulation packet, that the particular mapping database does not include a virtual-machine-to-host mapping indicating that the particular guest virtual machine is instantiated at the first virtualization host, discard the forwarded version as an invalid encapsulation packet.

11. The system as recited in claim 6, wherein the first virtualization management component is configured to:

in response to receiving, during the packet duplication phase, a third encapsulation packet directed to the particular guest virtual machine, transmit a forwarded version of the third encapsulation packet to the second virtualization host.

12. The system as recited in claim 6, wherein the first virtualization management component is configured to:

in response to a detection of a triggering condition, determine that the packet duplication phase is to be terminated; and initiate a transmission of a message to the second virtualization management component, wherein the message indicates that the packet duplication phase is to be terminated.

13. The system as recited in claim 11, wherein the detection of the triggering condition comprises one or more of: (a) a detection that the time elapsed since the migrated version of the particular guest virtual machine was instantiated at the second virtualization host exceeds a first threshold, or (b) a determination that a rate at which packets directed to the particular guest virtual machine are received at the first virtualization management component has fallen below a second threshold.

14. The system as recited in claim 6, wherein the second virtualization management component is configured to:

after receiving an indication that the packet duplication phase is to be terminated, transmit a third encapsulation packet to the third virtualization host without transmitting a corresponding encapsulation packet to the first virtualization host, wherein the third encapsulation packet comprises a second baseline packet generated by the migrated version of the particular guest virtual machine, and wherein the second baseline packet is directed to the different guest virtual machine.

15. The system as recited in claim 6, wherein the first virtualization management component is configured to:

in response to a detection of a triggering condition, determine that the packet duplication phase is to be initiated; and initiate a transmission of a message to the second virtualization management component, wherein the message indicates that the packet duplication phase is to be initiated.

16. The system as recited in claim 14, wherein the detection of the triggering condition comprises one or more of: (a) a detection that contents of at least a portion of memory allocated to the particular guest virtual machine have been copied from the first virtualization host to the second virtualization host or (b) a detection that a propagation of a particular virtual-machine-to-host mapping to one or more destinations including the third virtualization host has been initiated, wherein the particular virtual-machine-to-host mapping indicates that the particular guest virtual machine is instantiated at the second virtualization host.

17. A non-transitory computer-accessible storage medium storing program instructions that when executed on one or more processors implement a virtualization management component at a particular virtualization host of a virtual computing service, wherein the virtualization management component is configured to:

receive an indication that a packet duplication phase of a migration of a particular guest virtual machine from a first virtualization host to the particular virtualization host has been initiated;

detect that a migrated version of the particular guest virtual machine, instantiated at the particular virtualization host, has generated a first baseline packet directed to a destination address, wherein the destination address is not assigned to another guest virtual machine instantiated at the particular virtualization host; and transmit: (a) a first encapsulation packet comprising the first baseline packet to an encapsulation intermediary associated with the destination address and (b) a second encapsulation packet comprising the first baseline packet to the first virtualization host, wherein the second encapsulation packet includes a directive to forward the second encapsulation packet to the encapsulation intermediary from the first virtualization host.

18. The non-transitory computer-accessible storage medium as recited in claim 17, wherein the destination address is assigned to a second guest virtual machine instantiated at a different virtualization host of the virtual computing service, and wherein the encapsulation intermediary comprises a virtualization management component of the different virtualization host.

19. The non-transitory computer-accessible storage medium as recited in claim 17, wherein the virtual computing service is implemented at a provider network, wherein the destination address is assigned to a computing device of a different service of the provider network, and wherein the encapsulation intermediary comprises a component of an edge router of the virtual computing service.

20. The non-transitory computer-accessible storage medium as recited in claim 17, wherein the virtualization management component of the particular virtualization host is configured to:
  determine that the particular guest virtual machine is to be migrated to a second virtualization host from the particular virtualization host;
  in response to a detection of a first triggering condition, (a) determine that the packet duplication phase for migration of the particular guest virtual machine to the second virtualization host is to be initiated and (b) initiate a notification that the packet duplication phase has been initiated to a virtualization management component of the second virtualization host.

* * * * *